(12) United States Patent
Furst et al.

(10) Patent No.: US 6,338,011 B1
(45) Date of Patent: Jan. 8, 2002

(54) METHOD AND APPARATUS FOR SHARING VEHICLE TELEMETRY DATA AMONG A PLURALITY OF USERS OVER A COMMUNICATIONS NETWORK

(75) Inventors: David I. Furst, Jessup; Michael A. Abrams, Columbia; Robert C. MacKenzie, Ellicott City; Eric B. Tissue, Eldersburg; Warren I. Citrin, Highland, all of MD (US)

(73) Assignee: Solipsys Corporation, Laurel, MD (US)

( * ) Notice: Subject to any disclaimer, the term of this patent is extended or adjusted under 35 U.S.C. 154(b) by 0 days.

(21) Appl. No.: 09/480,859

(22) Filed: Jan. 11, 2000

(51) Int. Cl.$^7$ ................................. G06F 11/18

(52) U.S. Cl. .............. 701/1; 701/24; 701/27; 701/29; 342/159

(58) Field of Search .................. 701/1, 24, 27, 701/29, 30, 34, 3, 14; 340/825.15, 438, 445, 501; 342/159

(56) References Cited

U.S. PATENT DOCUMENTS

| | | | | |
|---|---|---|---|---|
| 4,860,216 A | | 8/1989 | Linsenmayer | 342/159 |
| 5,302,955 A | | 4/1994 | Schutte et al. | 342/59 |
| 5,809,437 A | * | 9/1998 | Breed | 701/29 |
| 6,115,654 A | * | 9/2000 | Eid et al. | 701/34 |
| 6,173,159 B1 | * | 1/2001 | Wright et al. | 455/66 |

OTHER PUBLICATIONS

Martin E. Liggins, II, et al., "Distributed Fusion Architectures and Algorithms for Target Tracking", Proceedings of the IEEE, vol. 85, No. 1, (XP–002166088) Jan., 1997, pp. 95–106.

D. M. Hosmer, "Data–Linked Associate Systems", 1994 IEEE International Conference on Systems, Man, and Cybernetics. Humans, Information and Technology (Cat. No. 94CH3571–5), Proceedings of IEEE International Conference on Systems, Man and Cybernetics, San Antonio, TX, vol. 3, (XP–002166089) (1994), pp. 2075–2079.

\* cited by examiner

*Primary Examiner*—William A. Cuchlinski, Jr.
*Assistant Examiner*—Marthe Y. Marc-Coleman
(74) *Attorney, Agent, or Firm*—Katten Muchin Zavis

(57) ABSTRACT

In an Integrated Air Traffic Control System, apparatus, method, and software for sharing vehicle telemetry information between a plurality of sensors of different types and a plurality of users of different types utilizes a communications network coupling together the plurality of sensors and the plurality of users. A plurality of sensor processor devices are respectively coupled to the plurality of sensors, each sensor processor device being configured to receive vehicle telemetry information from its associated sensor, and to convert the receive vehicle information into common vehicle data of a type common to the plurality of users. A plurality of user processor devices are respectively coupled to the plurality of users, each user processor device being configured to receive a demand signal from its associated user and to transmit it to said communications network when it determines that its associated user has a predetermined vehicle profile which requires improvement. Each of the plurality of sensor processor devices receives the demand signal from the communications network and transmits its common vehicle data to the communications network when it determines that its associated sensor can provide vehicle information which improves the vehicle information profile.

35 Claims, 5 Drawing Sheets

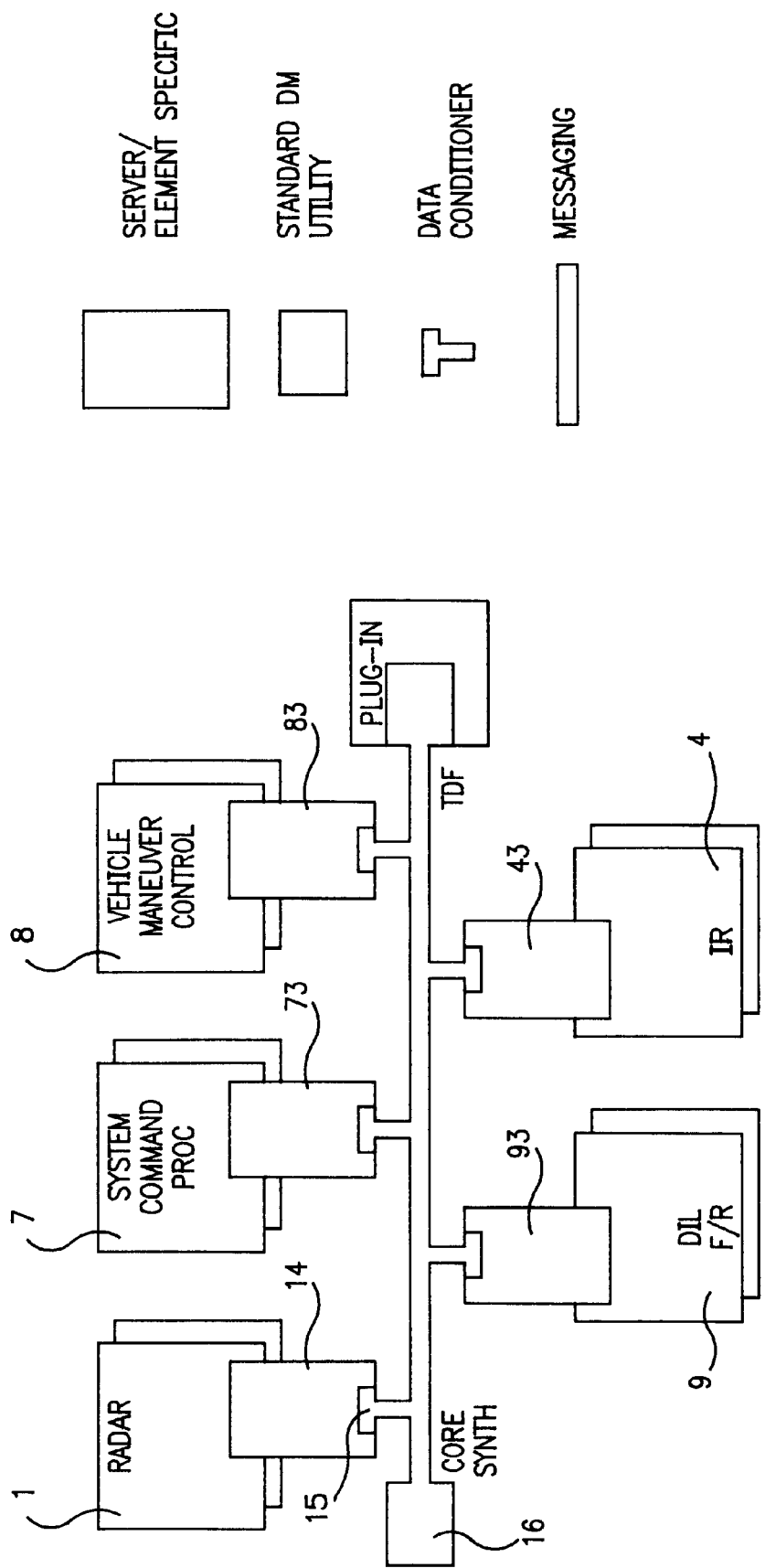

METHOD AND APPARATUS FOR SHARING VEHICLE TELEMETRY DATA AMONG A PLURALITY OF USERS OVER A COMMUNICATIONS NETWORK

BACKGROUND OF THE INVENTION

1. Technical Field

The present invention relates to a system for sharing vehicle telemetry data between a plurality of sensors of different types and a plurality of users of different types. More particularly, the present invention relates to a system whereby vehicle telemetry information is shared on an "as needed" basis in order to reduce the communications bandwidth required among the various sensors and users. Preferably, communications among the various sensors and users is carried out in a common data format to enhance system integrity and, again, reduce bandwidth requirements.

2. Related Art

At present, there is a need to share vehicle telemetry data in systems containing different types of sensors and different types of users. For example, in an Integrated Air Traffic Control system, it is vital that vehicle speed, course, and altitude information be sensed and transmitted to the various users in a time-critical fashion. However, such an Air Traffic Control system may use different types of sensors such as radar, liar, infrared, acoustic, wind shear, and other sensors; and may have different types of information users, such as the aircraft, the control tower, weather service offices, airline control centers, etc. Moreover, there may be different versions of sensors in the system; for example, newer radar systems may have been installed and used in conjunction with older radar systems. These different types of sensors will transmit different kinds of data in different data formats.

On the user side, each user has need for different data at different times and from different sensors. For example, the aircraft pilot needs wind shear information, as well as radar and lidar telemetry data regarding other aircraft. The control tower needs this information for all aircraft, and needs to integrate all sensed information into a common display or situation picture. The wind shear information needs to be updated at a different frequency than the radar information.

At present, each sensor broadcasts its data to the entire system at a selectable interval, and all users receive all data. In addition, certain users may request special updates from selected sensors. However, as the number of sensors and the number of users within the system increases, a communications bandwidth problem arises which may lead to system breakdown or, at the least, late reception of vital data. For example, an aircraft may receive delayed other-vehicle course and speed information because of an incoming wind shear update.

The above-noted problems are exacerbated because of the different data formats used by the various sensors and users. The communications network (radio or land-line) may simply be expanded to provide increased bandwidth, but this is expensive, time-consuming, and has to be carried out for each incremental increase in number of sensors and/or users.

Thus, what is needed is a vehicle telemetry system which can control the flow of information from the various sensors to the various users without increasing the bandwidth of the system. Such a system should allow sensors and users to be added to the system or removed from the system without affecting the stability or integrity of the information flow within the system.

SUMMARY OF THE INVENTION

It is an object of the present invention to overcome the problems noted above and to provide a flexible, reduced-bandwidth information-sharing system that can selectively provide users with accurate and timely vehicle telemetry information from different sensor sources.

According to one aspect of the present invention, apparatus for sharing vehicle telemetry information between a plurality of sensors of different types and a plurality of users of different types includes a communications network coupling together the plurality of sensors and the plurality of users. A plurality of sensor processor devices is respectively coupled to the plurality of sensors, each processor device configured to receive vehicle telemetry information from its associated sensor, and to convert the receive vehicle information into common vehicle data of a type common to the plurality of users. A plurality of user processor devices is respectively coupled to the plurality of users, each processor device configured to receive a demand signal from its associated user and to transmit it to said communications network when it determines that its associated user has a predetermined vehicle profile which requires improvement. Each of said plurality of sensor processor devices receiving the demand signal from said communications network and transmitting its common vehicle data to the communications network when it determines that its associated sensor can provide vehicle information which improves said vehicle information profile.

According to another aspect of the present invention, a system for communicating vehicle track information, over a communications network, among a plurality of platforms (each of which has (i) a sensor and (ii) an operational unit which requires the vehicle track information), includes a first processing structure, coupled to a first one of said platforms, for processing vehicle track data from its associated first sensor and providing it to its associated first operational unit. The first processing structure provides a first current observation related estimate based on (i) the vehicle track data from the first sensor and (ii) reporting needs of the associated first operational unit or reporting needs received over the communications network. The first processing structure transmits the reporting needs to the communications network when it determines that its associated first operational unit requires an update to a stored first vehicle track profile. A second processing structure is coupled to a second one of said platforms and processes vehicle track data from its associated second sensor and provides it to its associated second operational unit. The second processing structure provides a second current observation related estimate based on (i) the vehicle track data from the second sensor and (ii) reporting needs of the associated second operational unit or reporting needs received over the communications network. The second processing structure transmits a reporting need to the communications network when it determines that its associated second operational unit requires an update to a stored second vehicle track profile. Each said processing structure develops a fusion algorithm combined track by fusing together (i) current observation related estimates received over the communications network and (ii) current observation related estimates provided by that processing structure.

According to a further aspect of the present invention, a method of distributing vehicle track data over a communications network to a plurality of users each of which comprises a sensor and an operational unit, includes the steps of: (i) sensing a vehicle track with a first sensor of a first user; (ii) generating, at the first user, a first current observation related estimate based on the sensed vehicle track and reporting needs; (iii) transmitting the first current observation related estimate to the communications network when it is determined that the first current observation related estimate will improve a predetermined vehicle track profile; (iv) receiving, at the first user, a second current observation related estimate generated by a second user and transmitted over the communications network; (v) fusing, at the first user, the first current observation related estimate and the second current observation related estimate to provide a fusion algorithm combined track; and (vi) providing the fusion algorithm combined track to a first operational unit.

According to still another aspect of the present invention, one or more computer-readable storage mediums containing one or more computer programs for causing one or more computers to distribute vehicle track data over a communications network to a plurality of users each of which comprises a sensor and an operational unit, causes the one or more computers to perform the steps of: (i) sensing a vehicle track with a first sensor of a first user; (ii) generating, at the first user, a first current observation related estimate based on the sensed vehicle track and reporting needs; (iii) transmitting the first current observation related estimate to the communications network when it is determined that the first current observation related estimate will improve a predetermined vehicle track profile; (iv) receiving, at the first user, a second current observation related estimate generated by a second user and transmitted over the communications network; (v) fusing, at the first user, the first current observation related estimate and the second current observation related estimate to provide a fusion algorithm combined track; and (vi) providing the fusion algorithm combined track to a first operational unit.

BRIEF DESCRIPTION OF THE DRAWINGS

The structure and functions of the present invention will be more readily understood from the following detailed description of the presently preferred exemplary embodiment when taken in conjunction with the following Drawings.

FIG. 5 is a notional depiction of the DCN/DM structure and functions to be described below.

DETAILED DESCRIPTION OF THE PREFERRED EMBODIMENTS

1. Introduction

The present invention will now be described with respect to an air vehicle telemetry-sharing system that senses, transmits, and shares vehicle course, speed, and altitude data among a plurality of sensors and a plurality of users. However, the present invention is also applicable to systems which acquire and share telemetry information from other vehicles, such as land vehicles, sea surface vehicles, sub-sea vehicles, space vehicles, or a combination of these vehicles.

Figure 1:
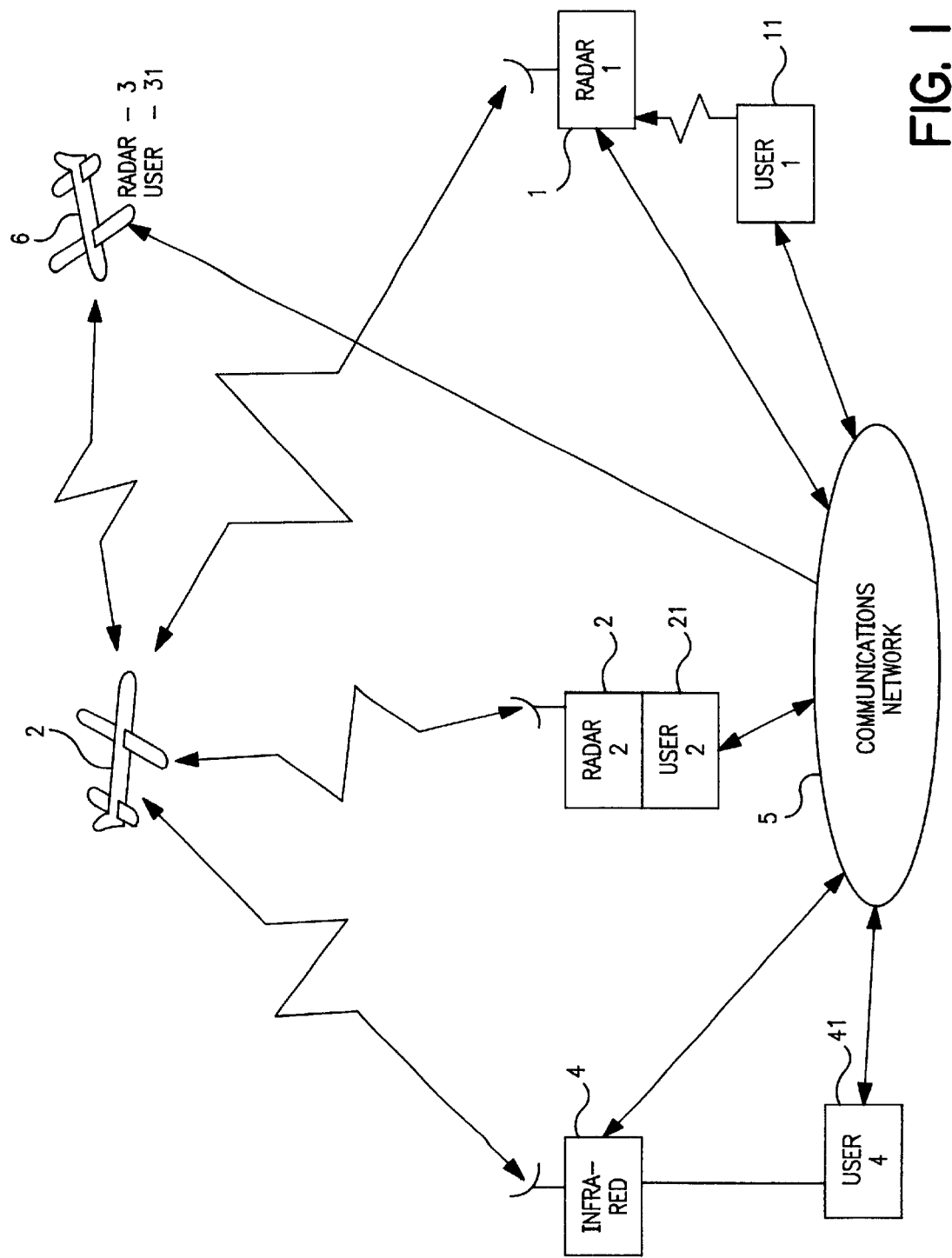
FIG. 1 is a schematic representation of the apparatus according to a first embodiment of the present invention.

In FIG. 1, the telemetry data of an aircraft 20 is detected by a radar 1, by a radar 2, by an infrared sensor 4, and by a radar 3 which is mounted in a second aircraft 6. In this embodiment, each sensor has a corresponding user to which it provides the telemetry data sensed by the associated sensor. For example, radar 1 may be an airport radar which radios the sensed telemetry data to an associated user 11 which may comprise one or more processors in the Control Tower which provide information to the Air Traffic Control staff. The radar 2 may comprise a newer-style radar directly coupled to a user 21 processor which monitors telemetry data for an airline. Infrared sensor 4 may provide sensed telemetry data over a landline to a processor of user 41 which supplies information to a weather network. The aircraft 6 has an aircraft radar 3 which supplies sensed telemetry data to the flight control computers onboard the aircraft. The user 31 thus comprises the aircrew of aircraft. All users and sensors are in communication with each other over a communications network 50 which may comprise one or more landline, radio, satellite, microwave, etc. links. As will be developed below, the communication network 50 is expandable and flexible. According to the present invention, bandwidth in the communication network 50 is conserved since each sensor's telemetry data will be transmitted to the communications network only when that data can improve the telemetry information available to the network users. On the other hand, users will only request telemetry information from the communication network when the information available on the network is superior to that obtained locally.

2. System Overview

The embodiment of FIG. 1 presents an architecture for an extensible, evolvable, multi-level sensor data fusion system that creates a distributed data base from multiple sensors. The data is fused because it combines vehicle track state data (e.g., position and rate measurements) from multiple radar or other multi-dimensional sensors. These sensors may be located at multiple sites. The data base is distributed because each sensor and/or user stores both the vehicle information it acquires and the vehicle information it obtains from the other sensors/users over the communications network. For example, the sensor measurements are processed locally, and resulting information is exchanged over a communications network comprising one or more data distribution networks. The networks can be limited in bandwidth, but typically should have transmission delays that are on the order of the measurement period of the sensors, or smaller, to derive the best performance from the process.

The architecture provides the capability for multi-level data exchange to create a vehicle track picture that is in a common frame of reference called the "Common Frame Track Picture". The Common Frame Track Picture is shared by all "Data Sources" (each of which may comprise one or more sensors that may be associated with one or more processors) and "Data Users" (each of which include one or more processors for processing the telemetry data) in a set of data distribution networks. Each Data User requests, over the communications network, the level of track accuracy it needs (e.g., vehicle speed within plus or minus 5 feet per second) according to track identity (e.g., which aircraft), type (e.g., aircraft size), category (e.g., commercial), status (e.g., landing), geographic location (e.g., in the landing pattern), etc. These requests are mapped to the Data User's "Reporting Needs" for each vehicle track. The Data Sources then provide, over the communications network, the level of data appropriate to the requesting Data User to support the requested Reporting Needs. This requesting and supplying of information on an "as needed" basis controls the growth in distribution bandwidth requirements to a level that can be supported in large, widely distributed multi-level user networks. The functional components of the system are structured to allow single-point additions of or changes to Data Sources and Data Users. The addition of new sources and users does not affect the computational complexity of the existing network components for a given number of supported tracks. This de-coupled component structure is designed in such a way that existing components need no modification for new components to use and contribute to network data.

Components of widely distributed multi-level Data User networks may not have bandwidth available to share a set of identical complete vehicle track data throughout the networks at the accuracy required by the most demanding Data Users. However, they can share highly accurate track data requested by specific users while supporting other levels of track accuracy according to Data User requests. In this approach, Data Users request data by track identity, type, category, geographic location, at the situation awareness level, the planning level, or the maneuvering level. Data are accumulated, condensed, registered, and distributed as needed in a common geodetic coordinate frame with corresponding ellipsoidal covariance information. These messages are called "Current Observation Related Estimates" (CORE). The CORE fusion function (to be described below) at each Data User assembles the Common Frame Track Picture from this low bandwidth data without the need for source location or sensor identity information.

Figure 2:
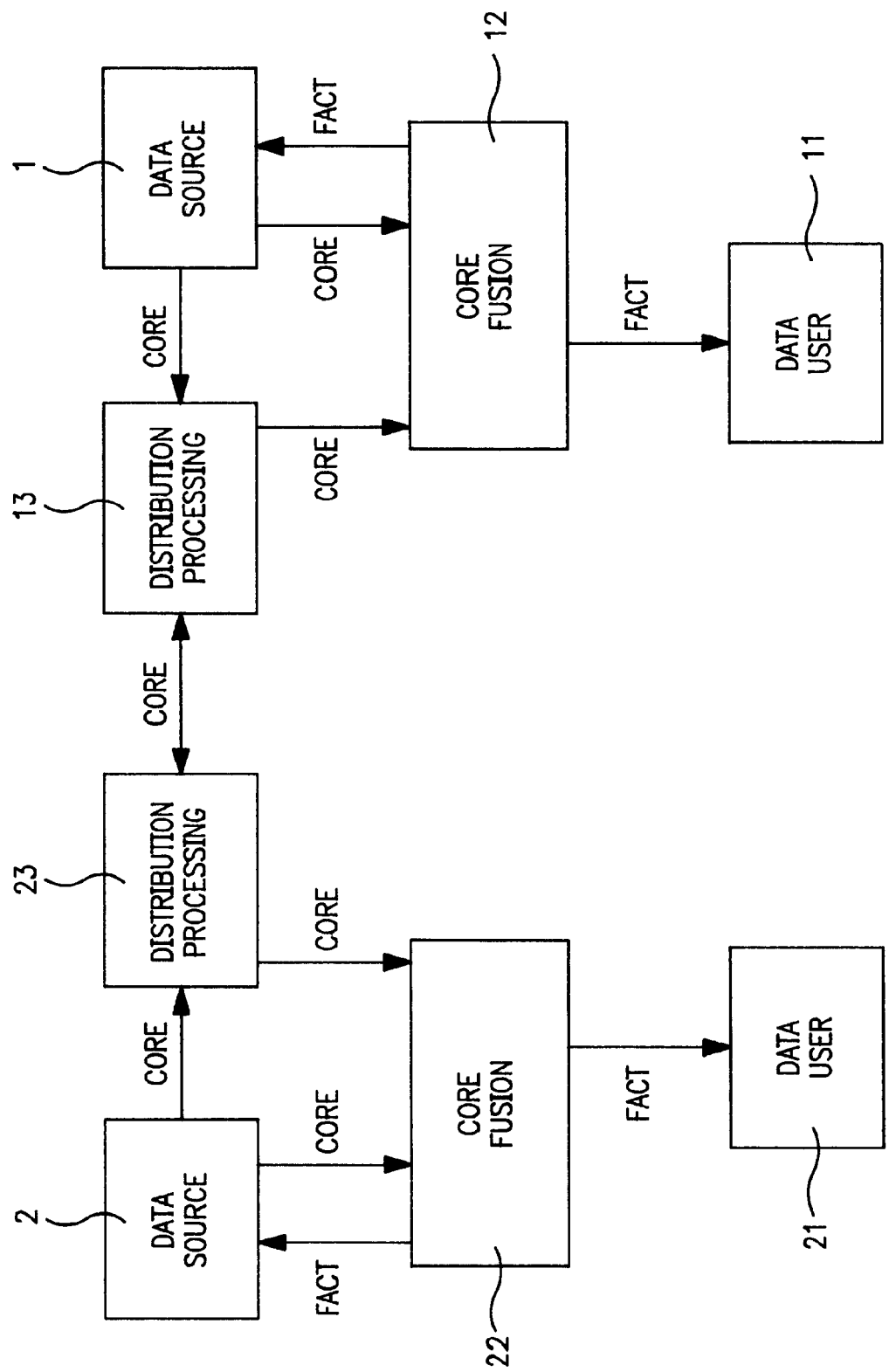
FIG. 2 is a functional depiction of the exchange of CORE and FACTs (to be described below) among the Data Sources and the Data Users in the embodiment of FIG. 1.

FIG. 2 depicts the exchange of CORE and FACTs. CORE are created from sensor measurement data at each Data Source 11 and 21, and distributed in a common recognizable form throughout the low-latency network for use by CORE fusion functions 12 and 22. Network data distribution is managed by Distribution Processing 13 and 23. CORE fusion functions 12 and 22 create Fusion Algorithm Combined Tracks (FACTs) for use by local platform functions that need vehicle track states. These functions are part of the Data Users and Data Sources.

Figure 3:
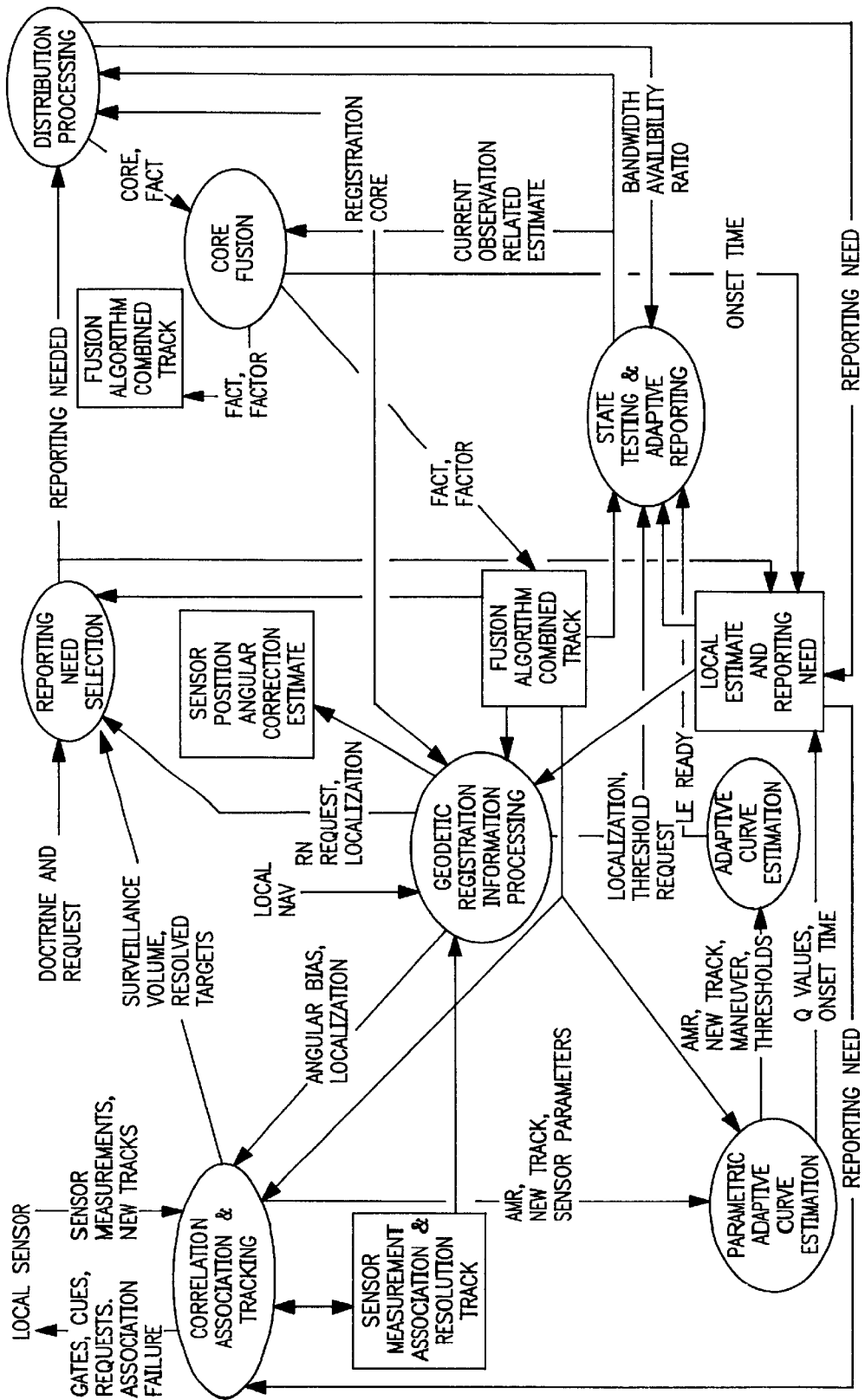
FIG. 3 is an information flow diagram showing the interaction between the key functions within a Data Source in the embodiment of FIG. 1.

FIG. 3 is an information flow diagram showing the interaction between the key functions within a Data Source and with a CORE Fusion and Distribution Processing function. The Data Source includes all functions necessary to support a sensor's interaction with CORE Fusion and with a distribution network. The Data Source's primary function is to create CORE from its corresponding sensor's data based on identified Reporting Needs. CORE are distributed through a network to CORE Fusion utilities at each network node where they update the corresponding FACTs. FACT states are sent to the Data Sources for use in the creation of CORE and the association of sensor data.

Local Reporting Needs are selected according to operational doctrine, request, track resolution requirements, registration requirements, and local sensor surveillance volume. This selection is done by the Reporting Need Selection function (RNS). These Reporting Needs (RNs) are distributed throughout the network to pull the necessary track data. Angular sensor bias and sensor localization are estimated by the Geodetic Registration Information Processing (GRIP) function. GRIP combines various levels of registration solutions, depending on the available registration data sources, such as navigational instrument (NAV) data (including local platform GPS and reference track GPS), local sensor data, remote Registration CORE, and remote CORE used to form FACTORs (FACTs on Remote CORE). Sensor measurement data are corrected for angular bias as a function of relative vehicle-sensor position using accumulated data in the Sensor Position Angular Correction Estimate file (SPACE). Correlation, Association, and Tracking (CAT) validates the association of measurement data to a Sensor Measurement Association & Resolution Track file used for local hypothesis testing and gating. Resulting unambiguous Associated Measurement Reports (AMRs) are sent to Parametric Adaptive Curve Estimation (PACE) where they are used to detect and estimate significant vehicle accelerations and maneuvers. Then the AMRs are sent to Adaptive Curve Estimation (ACE) where they are used to form straight trajectory and maneuvering vehicle hypotheses as Local Estimates for each Reporting Need. ACE selects the best hypotheses at the addition of each measurement. The hypotheses selected by ACE is used by the State Testing and Adaptive Reporting (STAR) function to determine if a CORE should be created from the selected Local Estimate. In STAR the corresponding FACT covariance is predicted to the current time and used to determine the immediate need for sensor data. The value of distributing a CORE produced from the Local Estimate is calculated. The immediate need and the added value are compared (to be described in greater detail below) to determine if a CORE is to be produced. The manner of comparison ensures that a CORE is produced only if it is needed and if the Local Estimate will currently offer the greatest improvement of all sources in the network. A Local Estimate is registered in a geodetic frame using the own-unit localization vector from the GRIP function to create a corresponding CORE. When a CORE from a registered sensor is distributed, the corresponding Local Estimates are cleared. Therefore, a series of CORE for any vehicle has independent sensor-related covariances.

CORE are most often distributed as 6-state estimates. However, 9-state and 3-state CORE are distributed for certain conditions and vehicle dynamics. The Data Fusion process uses these types of CORE to improve the FACT state. That improved state is available to local node Data Users and Data Sources. Data Sources then use the updated FACT in the STAR reporting decision and in CAT correlation and measurement association.

De-coupling in the structure of the CORE Fusion Process results in large part from the de-coupling of the registration and fusion processes. Localization and alignment occur in the Data Source. Data are then distributed in a geodetic frame using full covariance information, thus they are readily interpreted by all users without knowledge of the source location or type. Registration occurs at multiple levels simultaneously to ensure a robust solution. Registration results from all available data are combined to provide the most accurate solution.

STAR selects the data that will most efficiently fulfill the selected Reporting Needs (RN). Through an examination of the FACT rate error, thresholds for the Local Estimate (LE) data are determined. Since other contributing nodes use the same FACT, the knowledge that the local Data Source's LE can be used to create and distribute a CORE means that the local source has the best current contribution. If another unit had a better contribution, then it would have been distributed and the FACT accuracy would have induced a stricter threshold on local LE data, thereby preempting its distribution.

Figure 4:
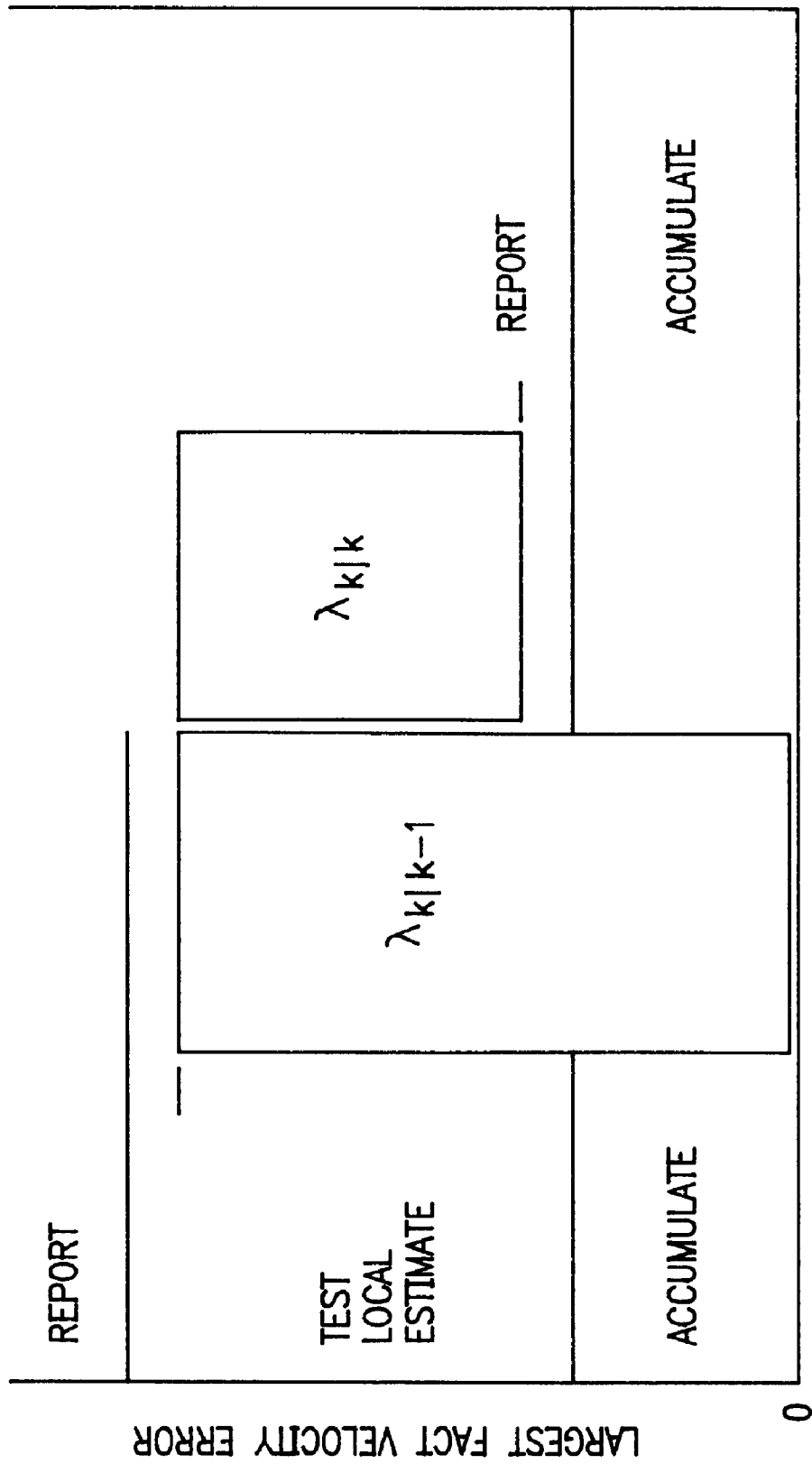
FIG. 4 is a functional depiction of the comparing operation for deciding whether or not to report a CORE to the communication network.

FIG. 4 depicts the operation of the STAR reporting decision. The quantity in the left box represents the magnitude of the predicted FACT rate error in its largest dimension. The quantity in the right box represents what would be the magnitude of the FACT rate error in its largest dimension if a CORE were distributed based on the Local Estimate. This is the improved FACT error. The predicted FACT rate error is compared against two thresholds determined by the requested Reporting Needs. If above the upper threshold, then a CORE is sent to reduce FACT error. Typical operation is below this threshold. Errors below the lower threshold indicate that no unit should send CORE, as the FACT is very accurate. Instead, ACE continues to accumulate sensor data in the form of Local Estimates with lower variances. Between these two thresholds, the improved FACT error (quantity on the left) is computed and subtracted from the predicted FACT error (quantity on the right). The difference is compared against a subsequent threshold to determine if a CORE should be sent. It is this latter comparison that ensures that STAR distributes the most valuable data, thereby preempting the prolific distribution of lower value data, thus conserving communication bandwidth. In fact, this algorithm reduces computational and data distribution complexity by a full computational order. It thereby enables networks to meet otherwise unattainable specifications for network size and track capacity, accuracy, and concurrency. It also provides a greater flexibility in the selection of appropriate data distribution equipment by driving bandwidth requirements down to the realm of commercial radios.

The magnitude of the predicted FACT rate error ellipsoid's largest dimension at the time of the Local Estimate is calculated by predicting the FACT to the time of the LE, and determining the largest eigenvalue of the rate covariance. The magnitude of the FACT rate error ellipsoid's largest dimension if a CORE were distributed is calculated by computing the filtered rate error that results from updating the FACT with the CORE and determining the largest eigenvalue of that rate covariance.

CORE from all sources are fused in the CORE Fusion functions at each network segment by a robust vehicle-oriented filter that produces the FACTs. CORE Fusion also can fuse FACT data and connect networks by correlating FACT data from different networks operating at different Reporting Needs.

This CORE Fusion Process allows functions to be allocated to software components in a variety of ways, as best suits the system application.

3. Structure and Software

The features of the present invention may be incorporated into existing sensor and user processors as software updates and/or processor enhancements. Also, it is envisaged that additional processors, which have the herein-described functionality incorporated therein, may be added to existing systems at the sensor side and/or at the user side. It is believed that once this system gains widespread acceptance, all hardware created for vehicle telemetry purposes will have this functionality built-in. Accordingly, the functions described herein may be incorporated as software only, hardware only, or a combination of software and hardware. The software may be encoded in any known medium such as hard discs, floppy discs, firmware, hardware, optical media, etc.

Where structure is depicted or described as being coupled, such coupling may be by metal or optical wire, RF communication, microwave, etc., either directly or indirectly through one or more other links. The processors described herein may be one or more singular, isolated processors, distributed processors, shared processors, co-located processors, remote processors, or any other processor architecture able to sense and share vehicle telemetry data.

While the hardware components according to the present invention are readily apparent from existing and predictable vehicle telemetry detecting technology, the software design represents a new paradigm in information detection and sharing. This is termed the Distributed Component Network/ Dynamic Middleware (DCN/DM) paradigm. The DCN/DM provides an architectural framework that directly addresses desired system characteristics. Rather than decompose the system based on functional areas such as detect/control maneuver, the present invention is premised on an object-based decomposition of the system into its distinct elements such as control, sensor, or Digital Information Link (DIL) forwarder/router. These element objects are then coupled with supporting objects and networked together as building blocks for more complex structures. These blocks are bound together through a middleware "glue", which ensures component independence. The objective is a framework, based on common components, which can be easily tailored to meet unique system requirements.

The nature of air traffic control system design is unique in that it is required to combine information from widely varying sources into a single, unambiguous data set. This middleware is defined as Dynamic Middleware (DM). DM is collection of standard utilities including Data Conditioner, CORE Synthesis, Visualization (Operational Display Framework [ODF]), and Messaging. A notional DCN/DM structured segment is shown in FIG. 5.

The principal components within a DCN segment involved in sensor data processing and data fusion are as follows:

1) Sensor Server 14 manages correlation, association, and tracking for the local sensor. Processing is optimized for the specific sensor. The server 14 provides the Data Conditioner 15 with Associated Measurements (AMRs) as well as new tracks. The server 14 may be developed by the sensor element owner because the domain knowledge of the server is highest at the source.

2) Each Data Conditioner function 15 provides generic interface for exchange of sensor information with element servers. It also provides needs/accuracy-based data distribution. Finally ech data conditioner accumulates and distributes AMRs as Current Observation-Related Estimates (CORE) to local and remote CORE Synthesis utilities, based on needs expressed by the end user and the resulting improvement in the network track state.

3) CORE Synthesis function 16 fuses CORE data with the network track state into a Fusion Algorithm Combined Track (FACT) for use by element servers and Data Conditioners.

4) Visualization functions at the user and/or sensor processors may provide a standard utility for display of FACT data. An internet browser-based design would allow element-specific display requirements to be provided by the element developer as plug-ins, or accessed directly from the server using mainstream technology such as the Hypertext Transfer Protocol (HTTP).

5) Messaging functions within the communications network 5 and each processor operate to distribute local CORE, receive remote CORE, and receive remote reporting needs.

4. Sensor Servers

Each sensor server will be programmed to carry out the following functions:

4.1 Measurement Conversion (MC)

4.1.1 Measurement Conversion Overview

The measurement conversion function transforms a measurement in sensor spherical coordinates to a measurement in the WGS84 coordinate system, a universal common coordinate system. To compute the converted measurement, MC requires as input the measurement in spherical coordinates (range, bearing, and elevation), the sensor's estimated geodetic location (latitude, longitude, and altitude), the north-pointing bias estimate, and the uncertainties associated with these quantities. The MC algorithm below gives the computation of the converted measurement with a correction for the estimated north-pointing bias. This is the measurement specified as the input to Adaptive Curve Estimation (ACE). Parametric Adaptive Curve Estimation (PACE) requires the converted measurement without the bias correction. In this case, the algorithm below with $\beta=\sigma_\beta=0$ will give the correct input. In addition, the uncorrected measurement converted to the sensor's local coordinate system is an intermediate product of computing the PACE input. This local converted measurement is currently a specified input for the GRIP function.

4.1.2 Measurement Conversion Function

The MC algorithm assumes that, at a given measurement time, there is an estimated sensor position in WGS84 Geodetic coordinates (latitude, longitude, altitude) available along with the measurement error matrix in local coordinates. Another function will be needed to interpolate or extrapolate the sensor position estimate to the measurement time.

4.1.2.1 Measurement Conversion Inputs:

1. $T_m$: Sensor measurement time in seconds.
2. R: Range measurement on track in meters.
3. B: Bearing measurement on track in radians.
4. E: Elevation measurement on track in radians.
5. $\sigma_R$: Range measurement error in meters.
6. $\sigma_B$: Bearing measurement error in meters.
7. $\sigma_E$: Elevation measurement error in meters.
8. $\phi$: Estimated sensor WGS84 Geodetic Latitude in radians at time $T_m$.
9. $\lambda$: Estimated sensor WGS84 Geodetic Longitude in radians at time $T_m$.
10. H: Estimated sensor WGS84 Geodetic altitude in meters at time $T_m$.
11. $R_s$: Sensor position estimate covariance matrix (3×3) in the local (sensor-centered) coordinate system.
12. $\beta$: Estimated north-pointing bias in radians.
13. $\sigma_\beta$: Standard deviation of estimated north-pointing bias.

4.1.2.2 Measurement Conversion Outputs

1. $X_{WGS84}$: Converted measurement X coordinate in WGS84 coordinates.
2. $Y_{WGS84}$: Converted measurement Y coordinate in WGS84 coordinates.
3. $Z_{WGS84}$: Converted measurement Z coordinate in WGS84 coordinates.
4. $R_{WGS84}$: Converted measurement covariance matrix (3×3).

4.1.2.3 Measurement Conversion Equations

In developing the converted measurement, the following calculations are performed.

1. Correct the bearing measurement by subtracting the north-pointing bias estimate; compute the variance of the corrected bearing estimate.

$$\hat{B} = B - \beta$$

$$\sigma_{\hat{B}}^2 = \sigma_B^2 + \sigma_\beta^2$$

2. Transform the measurements into the local (sensor-centered) coordinate system.

$$X_L = R \sin \hat{B} \cos E$$

$$Y_L = R \cos \hat{B} \cos E$$

$$Z_L = R \sin E$$

Further, in local coordinates, the measurement covariance matrix is given by $$R_L = J \cdot \sigma^2(R, \hat{B}, E) \cdot J^T$$

where $$\sigma^2(R, \hat{B}, E) = \begin{bmatrix} \sigma_R^2 & 0 & 0 \\ 0 & \sigma_{\hat{B}}^2 & 0 \\ 0 & 0 & \sigma_E^2 \end{bmatrix}$$

$$J = \begin{bmatrix} \sin\hat{B}\cos E & R\cos\hat{B}\cos E & -R\sin\hat{B}\sin E \\ \cos\hat{B}\cos E & -R\sin\hat{B}\cos E & -R\cos\hat{B}\sin E \\ \sin E & 0 & R\cos E \end{bmatrix}$$

3. Transforming from local coordinates to WGS84 coordinates uses the estimated sensor position. Add the uncertainty in the measured local origin to $R_L$.

$$\hat{R}_L = R_L + R_s$$

4. Now get the measurement in the WGS84 coordinate frame; define
   e=First eccentricity of the WGS84 ellipsoid;
   $\alpha$=Equatorial radius of the Earth;
   $\rho$=Effective radius of curvature of the Earth at the latitude $\phi$.
   Then, $$\rho = \frac{\alpha}{\sqrt{1 - e^2 \sin^2 \phi}}$$

$$X_{WGS84} = (Z_L + \rho + H)\cos\phi \cos\lambda - Y_L \sin\phi \cos\lambda - X_L \sin\lambda$$

$$Y_{WGS84} = (Z_L + \rho + H)\cos\phi \sin\lambda - Y_L \sin\phi \sin\lambda + X_L \cos\lambda$$

$$Z_{WGS84} = (Z_L + (\rho(1-e^2) + H))\sin\phi + Y_L \cos\phi$$

5. The measurement error covariance matrix is given by the following.

$$R_{WGS84} = J \cdot \hat{R}_L \cdot J^T$$

where $$J = \begin{bmatrix} -\sin\lambda & -\sin\phi\cos\lambda & \cos\phi\cos\lambda \\ \cos\lambda & -\sin\phi\sin\lambda & \cos\phi\sin\lambda \\ 0 & \cos\phi & \sin\phi \end{bmatrix}$$

5. Data Conditioner

The Data Conditioner function 15 operates to condition the data flow between the Data User and Data Source processors and the communication network 5. The following functions are performed by the data conditioner:

5.1 Parametric Adaptive Curve Estimation (PACE)

5.1.1 PACE Overview

The PACE component or parametric adaptive curve estimation, which performs multiple tasks associated with vehicle maneuver detection, is described in detail in the following sections. The primary function of PACE is to indicate when a maneuver is in progress and indicate the onset time of the maneuver. A second function of PACE is to generate an estimate of acceleration for use in determining the q-values to be used in the filter estimates. A third function of PACE is to notify ACE when an extended maneuver is in progress. The functions of PACE may be overridden by information sent by the sensor server to the Data Conditioner. In other words, when the sensor or sensor server has a maneuver detection scheme optimal to the characteristics of the sensor and can provide one or more of the PACE output data, the generic PACE component of the Data Conditioner defers to the sensor server data.

5.1.1.1 Maneuver Detection

Based on the AMR history, PACE maintains a six-state estimate of the vehicle in WGS-84 coordinates with a finite memory filter. Assuming between m and 2m measurements are maintained in the filter memory, when 2m measurements have been accumulated, the first m measurements are erased from the filter's memory. The measurements in the finite memory filter could also be referred to as a sliding window of measurements. The distribution of each new measurement residual is tested and, depending on the results of the test, the filter is either updated with the measurement or the measurement is stored for later use. The measurement residual is the difference between the measurement and the predicted position of the vehicle at the time of the measurement. If some number, n, of consecutive measurements fail the residual test, a vehicle maneuver is declared. Note that the filter is extrapolated from a time prior to the n measurements that declare a maneuver and the n measurements have not been used to update the filter. Updating the filter with the measurements that declare the maneuver could possibly delay the declaration of the maneuver. For a non-maneuvering vehicle, the measurement residuals have a normal distribution with a mean of 0 and a covariance matrix that is the sum of the covariance of the measurement and the covariance of the predicted state. After a vehicle has begun a maneuver, the measurement residuals begin to fall outside of this distribution. Thus, the maneuver hypothesis tests the distribution of n consecutive residuals.

The numbers n and m may vary depending on the characteristics of the sensor such as update rate and measurement accuracy. PACE has been simulated with a sensor update rate of one measurement per second and performs well when three consecutive failures are required with between 20 and 40 measurements in the filter memory.

A false declaration occurs because of random statistical fluctuations in the innovation sequence. Thus, even a straight-line trajectory may induce a false maneuver detection if n consecutive residuals are large; however, since the random system noise is assumed to be zero-mean Gaussian noise, it is far less likely that these large residuals will be on the same side of the straight line trajectory. On the other hand, if a trajectory is truly curved and the system model is assuming a straight-line trajectory, then consecutive residuals are very likely to be on the same side of the assumed straight-line trajectory. However, if the trajectory has a change in speed but not a change in direction, the residuals are not as likely to fall on the same side of the trajectory. Thus, a sign test may accept the null hypothesis when there is in fact a maneuver. In order to detect both a change in direction as well as a change in speed, the current implementation of PACE does not employ a sign test.

Similarly, because of the random fluctuations in the AMR sequence, there may be up to n−1 consecutive measurements that do not pass the residual test before there is a measurement that does pass the residual test. When this occurs, the measurements that did not pass the residual test along with the measurement that did pass are used to update the filter. Because of errors due to miscorrelation, further system analysis may reveal that the measurements that do not pass the residual test should not be filtered.

The statistic for testing the distribution of the residuals is a chi-squared test using the complete covariance matrix. Since the residuals in x, y and z are likely to be correlated and the error ellipse may not be aligned with the x, y and z axes, the chi-squared test takes advantage of all the available information. For the non-maneuvering hypothesis, the probability of a false detection is the probability that all n residual tests have a false detection; thus, for the hypothesis test to have a confidence level of x percent, the individual residual tests must have a confidence level of $y=1-e^{1/n1n(1-x)}$ percent. The residuals are tested with the chi-squared value, $\chi^2(y,3)$. Section 5.1.2 below includes the equations and an algorithm summary for the statistical test.

After a maneuver has been detected, the filter is reinitialized using the last n+1 measurements. At least the last n measurements are in a maneuvering state as indicated by the residual tests. The measurement prior to the last n measurements may or may not have occurred prior to the onset of the maneuver; however, for regularly updated sensors with relatively small update periods, the measurement can be included in the filter reinitialization. If there is a large time period between the last measurement and the n consecutive measurements that declared the maneuver, the measurement should not be used in the filter reinitialization. While the onset of the maneuver occurred sometime prior to the n consecutive measurements that declared the maneuver, the estimated onset time, output by PACE and stored in the LEARN file, is defined as the time corresponding to the first of the n consecutive measurements.

5.1.1.2 Maneuver End Detect

During a maneuver, the filter estimates a straight line through the measurements in the maneuver and the measurements used in the residual test fall to one side of the filter's predicted state estimate. The measurements will continue to fail the residual test until the filter memory consists of non-maneuvering data. When n consecutive measurements have passed the residual test, the end of the maneuver is declared. Since the oldest measurements in the filter's memory may have occurred during the maneuver and may subsequently trigger a false maneuver detect, the filter memory is cleared after the end of the maneuver is declared.

Since maneuvers are usually of short duration, the maneuver end detect test needs to be based on a statistically significant number of measurements without degrading the response time to the end of the maneuver. After a maneuver is declared, the filter is reinitialized and p measurements, n<p<m, are accumulated before testing for the end of the maneuver is begun. Similar to the test for detecting the maneuver, n consecutive residuals must pass the residual test before the end of the maneuver is declared. For maneuvers of short duration, this test will overestimate the time at which the maneuver ended due to the number of measurements needed to initialize the filter. In the present model, at least p−1 measurements must be received after a maneuver is declared before the end of the maneuver can be detected. For longer maneuvers, PACE is less likely to declare the end of the maneuver too soon.

There are some scenarios where PACE may not accurately estimate the behavior of a vehicle. For example, when a maneuver begins shortly after a previous maneuver has ended, PACE may estimate them as one maneuver. This could happen if the second maneuver begins before the end of the first maneuver is detected. On the other hand, PACE may have a delay in detecting the second maneuver if the maneuver begins while PACE is reinitializing the filter following the end detect of the first maneuver. The delays in detecting the end of a maneuver and in detecting subsequent maneuvers are another consideration in determining appropriate lengths for the sliding window. While it is unlikely that the end of a maneuver would be declared too soon, there are scenarios where it is possible such as when a vehicle takes a turn in the opposite direction of its current turn. To avoid oscillating between a maneuvering state and a non-maneuvering state during a long maneuver, the FACT processing compensates for early end detects by delaying the return of the FACT to a non-maneuvering state.

A sliding window filter must have a reasonable number of measurements in its window to perform statistical tests but at the same time fade out measurements of the maneuvering hypothesis so that it can detect the end of the maneuver. An advantage of the current implementation of PACE is that the filter does not remember old data. Operating the filter over a sliding window of measurements allows the estimate to be determined by the most recent measurements. On the other hand, an apparent disadvantage of the above implementation of PACE is the inability to quickly detect the end of the maneuver. However, the fewer the measurements used to initialize a filter, the more false detects there will be following initialization. Thus, the trade-off is longer maneuvers versus fewer false detects, both maneuver begin detects and maneuver end detects.

5.1.1.3 Implementation of the Finite Memory Filter

In a finite memory filter, the measurements are processed like they are in the regular Kalman filter with a q-value of 0. However, old measurements are periodically dropped from the filter estimate. If the desired length of the sliding window is r measurements, then the filter is initialized and updated as usual with a q-value of 0. When r measurements have been accumulated, the filter estimate is stored as $(t_r, \hat{x}_r, P_r)$, representing the time, state and covariance of the filtered estimate respectively. The filter continues to be updated until 2*r measurements have been accumulated. At this point, the first r measurements are deleted from the filter memory according to the following equations:

$$\hat{x}_{2r}^{(r)} = P_{2r}^{(r)}(P_{2r|2r}^{-1}\hat{x}_{2r|2r} - P_{2r|r}^{-1}\hat{x}_{2r|r})$$

$$(P_{2r}^{(r)})^{-1} = P_{2r|2r}^{-1} - P_{2r|r}^{-1}$$

$$\hat{x}_{2r|r} = \Phi(2r, r)\hat{x}_r$$

$$P_{2r|r} = \Phi(2r, r) \cdot P_r \cdot \Phi^T(2r, r)$$

The filter is then updated with $\hat{x}_{2r}^{(r)}$ and $P_{2r}^{(r)}$ as its initial conditions. After accumulating the first r measurements, the filter estimate is conditioned on the last r to 2r measurements.

5.1.2 PACE Algorithm 5.1.2.1 Inputs
1. AMR in WGS-84, measurement accuracy
2. Filtered state maintained by PACE
3. A matrix of measurements
4. Maneuver flag
5. Critical value for residual test
6. Number of consecutive failures to declare a maneuver
7. Current number of measurements in the sliding window
8. Length of the sliding window with the non-maneuvering hypothesis
9. Length of the sliding window with the maneuvering hypothesis 5.1.2.2 Outputs
1. the filtered state updated by PACE
2. the updated matrix of measurements
3. the updated maneuver flag
4. the updated number of measurements in the sliding window
5. maneuver onset time 5.1.2.3 PACE Equations Statistical Distance Computation for the '$k^{th}$' measurement:

$$d^k = (m_k - H_k\hat{x}_k)^T(R_k + H_k\hat{P}_kH_k^T)^{-1}(m_k - H_k\hat{x}_k)$$

where
  $m_k = k^{th}$ measurement vector in WGS-84 x, y and z
  $\hat{x}_k$ = predicted state estimate at the time of the $k^{th}$ measurement
  $R_k$ = measurement error rotated into WGS-84 x, y and z
  $\hat{P}_k$ = predicted error covariance of the state at the time of the $k^{th}$ measurement This is a chi-squared random variable with three degrees of freedom.

5.1.2.4 PACE Pseudocode
1. Let r indicate the current size of the sliding window. If the vehicle is not maneuvering, r=m and if the vehicle is maneuvering, r=p. Set the maneuver onset time to the default value.
2. Store the new measurement in the measurement matrix.
3. If a filter estimate of the first r measurements has not been stored
   1) If the current state estimate has not been initialized and there are two or more measurements stored, initialize and update the state estimate. Delete the measurements from the measurement matrix.
   2) Else
      a) Update the state estimate with the new measurement.
      b) If the current number of measurements in the sliding window is r then store the state estimate as the filtered estimate of the first r measurements. Delete all but the new measurement from the measurement matrix.
4. Else . . . test the residual
   1) Calculate the statistical distance of the new AMR.
      a) Extrapolate the filter to the time of the new AMR and extract the position terms from the state and the covariance.
      b) The residual is the difference between the measured position and the predicted position.
      c) The covariance of the residual is the sum of the predicted covariance and the sensor measurement covariance in WGS-84.
      d) Calculate the test statistic.
   2) If the vehicle is non-maneuvering (as indicated by the maneuver flag)
      a) If the test statistic is greater than the critical value for the test then
         (1) The AMR failed the residual test.
         (2) Increase the number of consecutive failures by one (this number could be indicated by the value of the maneuver flag since other processes in the DC may need to know how likely it is that a maneuver has begun)

(3) If the number of consecutive failures is less than n then
   (a) Not enough failures to declare a maneuver.
   (b) The AMR is not used to update the filter.
(4) Else there were enough consecutive failures to declare a maneuver.
   (a) Store the measurement in the measurement matrix.
   (b) Set the maneuver onset time to the time of the first measurement stored in the measurement matrix (this corresponds to the measurement prior to the n consecutive measurements that declared the maneuver).
b) Else the AMR passed the residual test
   (1) Set the number of consecutive failures to zero.
   (2) Update the filter with all the measurements stored in the measurement matrix except the first measurement (the first measurement corresponds to the last measurement to update the filter, the others are measurements that did not pass the residual test).
   (3) Clear the measurement matrix except for the new AMR.
3) Else the vehicle is maneuvering . . . test for the end of the maneuver
a) If the test statistic is less than the critical value for the test
   (1) Increase the number of consecutive successes by one (this number could also be indicated by the value of the maneuver flag since other processes in the DC may need to know how likely it is that a maneuver has ended)
   (2) If the number of consecutive successes is n
      (a) Set the maneuver flag to non-maneuvering.
      (b) Need to (1) delete from the filter's memory any measurements that may have occurred during the maneuver and (2) expand the size of the window to m before further residual testing begins; update the filter with the measurements stored in the measurement matrix and delete the first p measurements from the filter's memory with the equations given above. It is unlikely that more than the first p measurements are of the maneuvering hypothesis. If, after the measurements stored in the measurement matrix are filtered, the number of measurements in the sliding window will exceed 2p, the first p measurements will be deleted as a result of updating the finite memory filter. Note that to minimize numerical error when there are fewer than 2p measurements in the filter estimate, the filter should be updated before the first p measurements are deleted. Finally, to expand the size of the window, delete the stored filtered estimate.
b) Else . . . the vehicle is still maneuvering
   (1) Set the number of consecutive successes to zero.
   (2) Update the filter with all the measurements stored in the measurement matrix except for the first measurement as it corresponds to the last measurement used to update the filter.

5.2 Adaptive Curve Estimation (ACE)
5.2.1 ACE Overview

Adaptive Curve Estimation maintains the local track state estimate stored in the LEARN file. A local track estimate in the LEARN file comprises a sequence of state estimates along with the corresponding sequence of converted measurements. Maintaining a sequence of measurements allows the computation of nine-state estimates only when they are needed which results in significant computational savings over continuously maintaining and updating a nine-state estimate. Maintaining the sequence of updated estimates permits the processing of estimates that are not in time order. This could happen in the case of a Link Data Conditioner (LDC) where measurements from two or more sensors are feeding into the single LDC. In practice, a large number of measurements could be used in forming the current LEARN file estimate. To prevent unlimited growth of the sequence of measurements and updates, only the N most recent for some number N are saved.

When a measurement arrives out of time order, it is inserted into the measurement list in the correct slot such that the list is time-ordered. ACE then begins with the state estimate previous to the out-of-order-measurement and updates the state estimate by filtering the sequence of measurements from the out-of-order measurement on to the most recent measurement.

Along with the LEARN file, inputs to ACE include sensor measurements registered and converted into geodetic coordinates and track maneuver information from the PACE function. Upon receiving an AMR, ACE checks the number of AMRs accumulated in the measurement sequence. If there have been no AMRs accumulated, ACE saves the AMR as the first measurement on the list. If there is only one saved AMR, ACE uses the old AMR along with the measurement on the list. If there is only one saved AMR, ACE uses the old AMR along with the new one to initialize a six-state estimate on the track. If there is more than one old AMR on the list, ACE uses the new AMR to update the six-state estimate via a Kalman Filter update. The Q matrix used is constructed by selecting between a high and a low q value depending on the maneuver indication by PACE: the high q value is used when PACE indicates that the track is maneuvering and the low q value is used otherwise.

If the PACE function indicates that a maneuver has been detected for a track that was previously not maneuvering, then ACE will respond by counting the number of stored AMRs with times before the maneuver start time estimated by PACE. If there are at least three of these AMRs on the list, then ACE uses them to develop a nine-state estimate on the track. The three oldest measurements are used to initialize the nine-state estimate and then subsequent measurements are used to update the estimate via the Kalman Filter update function. If there are not enough AMRs prior to the maneuver start time, take the next AMRs on the list to get the three needed for initialization. If there are only one or two AMRs total on the list, then ACE must accumulate more measurements before initializing the nine-state estimate.

ACE must also operate on the LEARN file estimate in response to updates of the FACT estimate by CORE Synthesis. If STAR decides to send a six-state CORE generated from the LEARN file estimate, then ACE wipes-out the current LEARN file estimate by setting the saved measurement and update lists to all zeros. Subsequent AMRs are used to reinitialize a new LEARN estimate on the track. Similarly, if STAR decides to send a nine-state CORE, then the AMRs that were used to construct the CORE must be deleted from the list. Any remaining AMRs in the measurement file are used to initialize a new LEARN file estimate on the track. Update of the FACT by a nine-state CORE results in similar processing. In this case, ACE wipes-out the track's update file and also deletes AMRs from the measurement file if their times are before maneuver start time sent with the nine-state CORE.

5.2.2 ACE Algorithm
5.2.2.1 ACE Inputs
1. New converted measurement: time, X, Y, Z in WGS84 rectangular coordinates, and upper triangular portion of the 3×3 matrix of measurement errors rotated into the WGS84 rectangular frame.
2. Current state estimate from the LEARN file. This comprises two sets of data:
   State Estimate Sequence List: a data structure containing up to some number, N, of the most recent updated track estimates (time, X, VX, Y, VY, Z, VZ, and the upper triangular portion of the 6×6 covariance matrix, P. Note: the State Estimate Sequence only has to be maintained if the possibility of AMRs arriving out of time order is allowed. If AMRs are always in time order, the history of state estimates is not needed.
   AMR Sequence List: a data structure containing the N converted measurements in WGS84 Cartesian coordinates (time, X, Y, Z, and the upper triangular portion of the 3×3 measurement covariance matrix, R) corresponding to the updates in the State Estimate Sequence List.
3. Q values: high and low q-values for six-state filter along with the nine-state filter q-value.
4. PACE information: maneuver indication and maneuver start-time estimate.
5. Flag indicating that this is a new maneuver (first maneuver detection).
6. Flag indicating that the last six-state estimate on vehicle j sent to STAR was used to update the FACT entry for vehicle j.
7. Flag indicating that a nine-state CORE updated the FACT entry for vehicle j.

5.2.2.2 ACE Outputs
1. Updates of the LEARN file estimate either incorporating the new measurement information or adjusting for a nine-state or local six-state update of the FACT estimate.
2. If needed (if this is the first update following a maneuver detection by PACE), a nine-state estimate at the maneuver start time.

5.2.2.3 ACE Pseudocode
For a new AMR, perform the following steps:
1. IF (Number_of_AMRs_Accumulated==N)
   Drop the oldest AMR and state estimate and shift the remaining AMRs and estimates down on the list.
   END IF
2. Add the new AMR to the next open slot in the AMR list.
3. IF (Number_of_AMRs_Accumulated==2)
   Initialize the six-state estimate (gives two estimates, one for each AMR) and add the estimates to the State Estimate Sequence list.
   ELSE IF (Number_of_AMRs_Accumulated>2)
   IF (PACE_Maneuver_Flag==Maneuvering)
   Q_Value=Q_High.
   ELSE
   Q_Value=Q_Low.
   END IF
   Update current State Estimate using Kalman Filter update and add the update to the State Estimate Sequence list.
   ELSE
   This is the first AMR on the list, so do nothing.
   END IF
4. IF (PACE_New_Maneuver_Flag==New_Maneuver)
   Find $N_t$, the number of AMRs in the AMR list with time≦PACE_Maneuver_Onset_Time.
   IF ($N_t$<3) AND (Number_ARMs_on_AMR_List≧3)
   $N_t$=3.
   END IF
   IF ($N_t$≧3)
   Initialize a nine-state estimate using the first 3 AMRs.
   Clear PACE_New_Maneuver_Flag.
   For I=4 . . . $N_t$ LOOP
      Update the nine-state estimate using AMR number I and the Kalman Filter update.
      END LOOP
   OUTPUT (nine-state estimate: time, position, velocity, acceleration, and 9×9 covariance matrix, P).
   ELSE
   Keep PACE_New_Maneuver_Flag=New_Maneuver and continue to accumulate AMRs.
   END IF
   END IF If the FACT has been updated by a local six-state estimate, perform the following steps:
1. Delete all entries from the AMR and State Estimate lists.

If the FACT has been updated by a local nine-state estimate, perform the following steps:
1. Find $N_t$, the number of AMRs in the AMR list that were used in constructing the nine-state estimate
2. Delete all entries from the State Estimate list.
3. Drop AMRs numbered 1 to $N_t$ and shift the remaining AMRs down on the list.
4. LET $N_a$=Number of AMRs remaining on the AMR list.
5. IF ($N_a$>2)
   Initialize a six-state estimate using the first 2 AMRs.
   For I=3 . . . $N_a$ LOOP
      Update the six-state estimate using AMR number I and the Kalman Filter update.
      END LOOP
   END IF If the FACT has been updated by a remote nine-state estimate, perform the following steps:
1. Find $N_t$, the number of AMRs in the AMR list with time>PACE_Maneuver_Onset_Time.
2. Delete all entries from the State Estimate list.
3. Drop AMRs numbered 1 to $N_t$ and shift the remaining AMRs down on the list.
4. LET $N_a$=Number of AMRs remaining on the AMR list.
5. IF ($N_a$>2)
   Initialize a six-state estimate using the first 2 AMRs.
   For I=3 . . . $N_a$ LOOP
      Update the six-state estimate using AMR number I and the Kalman Filter update.
      END LOOP
   END IF

5.2.3 ACE Initialization
5.2.3.1 ACE Initialization Overiview
As specified above, two measurements are required to initialize a six-state estimate and three measurements are required to initialize a nine-state estimate. If the required number of measurements is available for initialization, the initialization routine is accomplished through a weighted least squares estimate [Arthur, Gelb. *Applied Optimal Estimation*. (The M.I.T. Press: Cambridge, Mass. 1974) ISBN: 0-262-57048-3]. This type of initialization has been shown to improve convergence rates in a Kalman Filter.

5.2.3.2 ACE Initialization Algorithm

5.2.3.2.1 ACE Initialization Inputs

1. A list of AMRs of length two for a six-state estimate and of length three for a nine-state estimate.

5.2.3.2.2 ACE Initialization Outputs

1. A list of State Estimates at the times of the AMRs in the input list.

5.2.3.2.3 ACE Initialization Equations

Let $t_i$, $x_i$, $y_i$, $z_i$, and $R_i$, be, respectively, time, components, and covariance matrix of AMR i, for i=1,2. Also let $\hat{x}_i$, $P_i$ be the initialized state estimate and covariance at time $t_i$. Then the following equations for a six-state initialization.

$$w = \begin{bmatrix} x_1 \\ y_1 \\ z_1 \\ x_2 \\ y_2 \\ z_2 \end{bmatrix}$$

$$R_i = \begin{bmatrix} \sigma_{x_i}^2 & \sigma_{x_i y_i} & \sigma_{x_i z_i} \\ \sigma_{x_i y_i} & \sigma_{y_i}^2 & \sigma_{y_i z_i} \\ \sigma_{x_i z_i} & \sigma_{y_i z_i} & \sigma_{z_i}^2 \end{bmatrix}$$

$$\Delta T = t_2 - t_1$$

$$A = \begin{bmatrix} 1 & 0 & 0 & 0 & 0 & 0 \\ 0 & 0 & 1 & 0 & 0 & 0 \\ 0 & 0 & 0 & 0 & 1 & 0 \\ 1 & \Delta T & 0 & 0 & 0 & 0 \\ 0 & 0 & 1 & \Delta T & 0 & 0 \\ 0 & 0 & 0 & 0 & 1 & \Delta T \end{bmatrix}$$

$$\Phi = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix}$$

$$\Omega = \begin{bmatrix} \sigma_{x_1}^2 & \sigma_{x_1 y_1} & \sigma_{x_1 z_1} & 0 & 0 & 0 \\ \sigma_{x_1 y_1} & \sigma_{x_1}^2 & \sigma_{y_1 z_1} & 0 & 0 & 0 \\ \sigma_{x_1 z_1} & \sigma_{y_1 z_1} & \sigma_{x_1}^2 & 0 & 0 & 0 \\ 0 & 0 & 0 & \sigma_{x_2}^2 & \sigma_{x_2 y_2} & \sigma_{x_2 z_2} \\ 0 & 0 & 0 & \sigma_{x_2 y_2} & \sigma_{y_2}^2 & \sigma_{y_2 z_2} \\ 0 & 0 & 0 & \sigma_{x_2 z_2} & \sigma_{y_2 z_2} & \sigma_{z_2}^2 \end{bmatrix}$$

$$\hat{x}_1 = (A^T \Omega^{-1} A)^{-1} A^T \Omega^{-1} w$$

$$P_1 = (A^T \Omega^{-1} A)^{-1}$$

$$\hat{x}_2 = \Phi \hat{x}_1$$

$$P_2 = \Phi P_1 \Phi^T$$

The initialization for the nine-state estimate is similar. Let $t_i$, $x_i$, $y_i$, $z_i$, and $R_i$, be, respectively, time, components, and covariance matrix of AMR i, for i=1,3. Also let $\hat{x}_i$, $P_i$ be the initialized state estimate and covariance at time $t_i$. Then the following are the equations for a nine-state initialization.

$$w = \begin{bmatrix} x_1 \\ y_1 \\ z_1 \\ x_2 \\ y_2 \\ z_2 \\ x_3 \\ y_3 \\ z_3 \end{bmatrix}$$

$$R_i = \begin{bmatrix} \sigma_{x_i}^2 & \sigma_{x_i y_i} & \sigma_{x_i z_i} \\ \sigma_{x_i y_i} & \sigma_{y_i}^2 & \sigma_{y_i z_i} \\ \sigma_{x_i z_i} & \sigma_{y_i z_i} & \sigma_{z_i}^2 \end{bmatrix}$$

$$\Delta T_2 = t_2 - t_1$$

$$\Delta T_3 = t_3 - t_1$$

$$A = \begin{bmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \\ 1 & \Delta T_2 & \frac{1}{2}\Delta T_2^2 & 0 & 0 & 0 & 0 & 0 & 0 \\ 0 & 0 & 0 & 1 & \Delta T_2 & \frac{1}{2}\Delta T_2^2 & 0 & 0 & 0 \\ 0 & 0 & 0 & 0 & 0 & 0 & 1 & \Delta T_2 & \frac{1}{2}\Delta T_2^2 \\ 1 & \Delta T_3 & \frac{1}{2}\Delta T_3^2 & 0 & 0 & 0 & 0 & 0 & 0 \\ 0 & 0 & 0 & 1 & \Delta T_3 & \frac{1}{2}\Delta T_3^2 & 0 & 0 & 0 \\ 0 & 0 & 0 & 0 & 0 & 0 & 1 & \Delta T_3 & \frac{1}{2}\Delta T_3^2 \end{bmatrix}$$

$$\Phi_i = \begin{bmatrix} 1 & \Delta T_i & \frac{1}{2}\Delta T_i^2 & 0 & 0 & 0 & 0 & 0 & 0 \\ 0 & 1 & \Delta T_i & 0 & 0 & 0 & 0 & 0 & 0 \\ 0 & 0 & 1 & 0 & 0 & 0 & 0 & 0 & 0 \\ 0 & 0 & 0 & 1 & \Delta T_i & \frac{1}{2}\Delta T_i^2 & 0 & 0 & 0 \\ 0 & 0 & 0 & 0 & 1 & \Delta T_i & 0 & 0 & 0 \\ 0 & 0 & 0 & 0 & 0 & 1 & 0 & 0 & 0 \\ 0 & 0 & 0 & 0 & 0 & 0 & 1 & \Delta T_i & \frac{1}{2}\Delta T_i^2 \\ 0 & 0 & 0 & 0 & 0 & 0 & 0 & 1 & \Delta T_i \\ 0 & 0 & 0 & 0 & 0 & 0 & 0 & 0 & 1 \end{bmatrix}$$

$$\Omega = \begin{bmatrix} \sigma_{x_1}^2 & \sigma_{x_1 y_1} & \sigma_{x_1 z_1} & 0 & 0 & 0 & 0 & 0 & 0 \\ \sigma_{x_1 y_1} & \sigma_{x_1}^2 & \sigma_{y_1 z_1} & 0 & 0 & 0 & 0 & 0 & 0 \\ \sigma_{x_1 z_1} & \sigma_{y_1 z_1} & \sigma_{x_1}^2 & 0 & 0 & 0 & 0 & 0 & 0 \\ 0 & 0 & 0 & \sigma_{x_2}^2 & \sigma_{x_2 y_2} & \sigma_{x_2 z_2} & 0 & 0 & 0 \\ 0 & 0 & 0 & \sigma_{x_2 y_2} & \sigma_{y_2}^2 & \sigma_{y_2 z_2} & 0 & 0 & 0 \\ 0 & 0 & 0 & \sigma_{x_2 z_2} & \sigma_{y_2 z_2} & \sigma_{z_2}^2 & 0 & 0 & 0 \\ 0 & 0 & 0 & 0 & 0 & 0 & \sigma_{x_3}^2 & \sigma_{x_3 y_3} & \sigma_{x_3 z_3} \\ 0 & 0 & 0 & 0 & 0 & 0 & \sigma_{x_3 y_3} & \sigma_{y_3}^2 & \sigma_{y_3 z_3} \\ 0 & 0 & 0 & 0 & 0 & 0 & \sigma_{x_3 z_3} & \sigma_{y_3 z_3} & \sigma_{z_3}^2 \end{bmatrix}$$

$$\hat{x}_1 = (A^T \Omega^{-1} A)^{-1} A^T \Omega^{-1} w$$

$$P_1 (A^T \Omega^{-1} A)^{-1}$$

$$\hat{x}_2 = \Phi_2 \hat{x}_1$$

$$P_2 = \Phi_2 P_1 \Phi_2^T$$

$$\hat{x}_3 = \Phi_3 \hat{x}_2$$

$$P_3 = \Phi_3 P_2 \Phi_3^T$$

5.2.4 ACE Update

5.2.4.1 ACE Update Overview

After a new AMR has been added to a Measurement list that had at least two previous AMRs, the Update function updates the State Estimate list by incorporating the new measurement information with the previous state information using a Kalman Filter. The same set of Kalman Filter equations is used for updating both six- and nine-state estimates; the differences between six- and nine-states are in the structure of the matrices in the equations. The equations and matrices are given in the following algorithm description.

5.2.4.2 ACE Update Algorithm

5.2.4.2.1 ACE Update Inputs

1. AMR Sequence List with new AMR added.
2. State Estimate Sequence List.
3. Q value to be used in constructing the Q matrix used in computing the predicted error covariance matrix.

5.2.4.2.2 ACE Update Outputs

1. Updated State Estimate Sequence List with the update for the new AMR added.

ACE Update Equations

1. The Generalized Kalman Filter Algorithm [Arthur, Gelb. *Applied Optimal Estimation*. (The M.I.T. Press: Cambridge, Mass. 1974) ISBN: 0-262-57048-3] is provided in Table 1. The (+) sign indicates a filtered quantity while the (−) sign indicates a predicted quantity. These equations are used for both six-state and nine-state estimate updates.

TABLE 1

Generalized Kalman Filter Algorithm

| | |
|---|---|
| System Model | $x_k = \Phi_{k-1} \cdot x_{k-1} + w_{k-1}$; $w_k \sim N(0, Q_k)$ |
| Measurement Model | $m_k = H_k \cdot x_k + v_k$; $v_k \sim N(0, R_k)$ |
| Predicted State Estimate | $\hat{x}_k(-) = \Phi_{k-1} \cdot \hat{x}_{k-1}(+)$ |
| Predicted Error Covariance | $P_k(-) = \Phi_{k-1} \cdot P_{k-1}(+) \cdot \Phi_{k-1}^T + Q_{k-1}$ |
| Gain Matrix | $K_k = P_k(-) \cdot H_k^T [H_k \cdot P_k(-) \cdot H_k^T + R_k]^{-1}$ |
| Filtered State Estimate | $\hat{x}_k(+) = \hat{x}_k(-) + K_k[m_k - H_k \cdot \hat{x}_k(-)]$ |
| Filtered Error Covariance | $P_k(+) = [I - K_k \cdot H_k] P_k(-)$ |

Six-State Update Matrices

1. State Vector:

$$\hat{x} = \begin{bmatrix} x \\ \dot{x} \\ y \\ \dot{y} \\ z \\ \dot{z} \end{bmatrix}$$

2. Covariance Matrix:

$$P = \begin{bmatrix} \sigma_x^2 & \sigma_{x\dot{x}} & \sigma_{xy} & \sigma_{x\dot{y}} & \sigma_{xz} & \sigma_{x\dot{z}} \\ \sigma_{x\dot{x}} & \sigma_{\dot{x}}^2 & \sigma_{\dot{x}y} & \sigma_{\dot{x}\dot{y}} & \sigma_{\dot{x}z} & \sigma_{\dot{x}\dot{z}} \\ \sigma_{xy} & \sigma_{\dot{x}y} & \sigma_y^2 & \sigma_{y\dot{y}} & \sigma_{yz} & \sigma_{y\dot{z}} \\ \sigma_{x\dot{y}} & \sigma_{\dot{x}\dot{y}} & \sigma_{y\dot{y}} & \sigma_{\dot{y}}^2 & \sigma_{\dot{y}z} & \sigma_{\dot{y}\dot{z}} \\ \sigma_{xz} & \sigma_{\dot{x}z} & \sigma_{yz} & \sigma_{\dot{y}z} & \sigma_z^2 & \sigma_{z\dot{z}} \\ \sigma_{x\dot{z}} & \sigma_{\dot{x}\dot{z}} & \sigma_{y\dot{z}} & \sigma_{\dot{y}\dot{z}} & \sigma_{z\dot{z}} & \sigma_{\dot{z}}^2 \end{bmatrix}$$

3. Transition Matrix:

$$\Phi = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix}$$

4. Plant Noise Matrix:

$$Q = \begin{bmatrix} q\vartheta & 0 & 0 \\ 0 & q\vartheta & 0 \\ 0 & 0 & q\vartheta \end{bmatrix}$$

where $$\vartheta = \begin{bmatrix} \Delta T^4/3 & \Delta T^3/2 \\ \Delta T^3/2 & \Delta T^2 \end{bmatrix}$$

5. Measurement Vector:

$$m = \begin{bmatrix} x \\ y \\ z \end{bmatrix}$$

6. Measurement Covariance Matrix:

$$R_i = \begin{bmatrix} \sigma_x^2 & \sigma_{xy} & \sigma_{xz} \\ \sigma_{xy} & \sigma_y^2 & \sigma_{yz} \\ \sigma_{xz} & \sigma_{yz} & \sigma_z^2 \end{bmatrix}$$

7. Measurement Matrix:

$$H = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}$$

Nine-State Update Matrices

1. State Vector:

$$\hat{x} = \begin{bmatrix} x \\ \dot{x} \\ \ddot{x} \\ y \\ \dot{y} \\ \ddot{y} \\ z \\ \dot{z} \\ \ddot{z} \end{bmatrix}$$

2. Covariance Matrix:

$$P = \begin{bmatrix} \sigma_x^2 & \sigma_{x\dot{x}} & \sigma_{x\ddot{x}} & \sigma_{xy} & \sigma_{x\dot{y}} & \sigma_{x\ddot{y}} & \sigma_{xz} & \sigma_{x\dot{z}} & \sigma_{x\ddot{z}} \\ \sigma_{x\dot{x}} & \sigma_{\dot{x}}^2 & \sigma_{\dot{x}\ddot{x}} & \sigma_{\dot{x}y} & \sigma_{\dot{x}\dot{y}} & \sigma_{\dot{x}\ddot{y}} & \sigma_{\dot{x}z} & \sigma_{\dot{x}\dot{z}} & \sigma_{\dot{x}\ddot{z}} \\ \sigma_{x\ddot{x}} & \sigma_{\dot{x}\ddot{x}} & \sigma_{\ddot{x}}^2 & \sigma_{\ddot{x}y} & \sigma_{\ddot{x}\dot{y}} & \sigma_{\ddot{x}\ddot{y}} & \sigma_{\ddot{x}z} & \sigma_{\ddot{x}\dot{z}} & \sigma_{\ddot{x}\ddot{z}} \\ \sigma_{xy} & \sigma_{\dot{x}y} & \sigma_{\ddot{x}y} & \sigma_y^2 & \sigma_{y\dot{y}} & \sigma_{y\ddot{y}} & \sigma_{yz} & \sigma_{y\dot{z}} & \sigma_{y\ddot{z}} \\ \sigma_{x\dot{y}} & \sigma_{\dot{x}\dot{y}} & \sigma_{\ddot{x}\dot{y}} & \sigma_{y\dot{y}} & \sigma_{\dot{y}}^2 & \sigma_{\dot{y}\ddot{y}} & \sigma_{\dot{y}z} & \sigma_{\dot{y}\dot{z}} & \sigma_{\dot{y}\ddot{z}} \\ \sigma_{x\ddot{y}} & \sigma_{\dot{x}\ddot{y}} & \sigma_{\ddot{x}\ddot{y}} & \sigma_{y\ddot{y}} & \sigma_{\dot{y}\ddot{y}} & \sigma_{\ddot{y}}^2 & \sigma_{\ddot{y}z} & \sigma_{\ddot{y}\dot{z}} & \sigma_{\ddot{y}\ddot{z}} \\ \sigma_{xz} & \sigma_{\dot{x}z} & \sigma_{\ddot{x}z} & \sigma_{yz} & \sigma_{\dot{y}z} & \sigma_{\ddot{y}z} & \sigma_z^2 & \sigma_{z\dot{z}} & \sigma_{z\ddot{z}} \\ \sigma_{x\dot{z}} & \sigma_{\dot{x}\dot{z}} & \sigma_{\ddot{x}\dot{z}} & \sigma_{y\dot{z}} & \sigma_{\dot{y}\dot{z}} & \sigma_{\ddot{y}\dot{z}} & \sigma_{z\dot{z}} & \sigma_{\dot{z}}^2 & \sigma_{\dot{z}\ddot{z}} \\ \sigma_{x\ddot{z}} & \sigma_{\dot{x}\ddot{z}} & \sigma_{\ddot{x}\ddot{z}} & \sigma_{y\ddot{z}} & \sigma_{\dot{y}\ddot{z}} & \sigma_{\ddot{y}\ddot{z}} & \sigma_{z\ddot{z}} & \sigma_{\dot{z}\ddot{z}} & \sigma_{\ddot{z}}^2 \end{bmatrix}$$

3. Transition Matrix:

$$\Phi = \begin{bmatrix} 1 & \Delta T & \frac{1}{2}\Delta T^2 & 0 & 0 & 0 & 0 & 0 & 0 \\ 0 & 1 & \Delta T & 0 & 0 & 0 & 0 & 0 & 0 \\ 0 & 0 & 1 & 0 & 0 & 0 & 0 & 0 & 0 \\ 0 & 0 & 0 & 1 & \Delta T & \frac{1}{2}\Delta T^2 & 0 & 0 & 0 \\ 0 & 0 & 0 & 0 & 1 & \Delta T & 0 & 0 & 0 \\ 0 & 0 & 0 & 0 & 0 & 1 & 0 & 0 & 0 \\ 0 & 0 & 0 & 0 & 0 & 0 & 1 & \Delta T & \frac{1}{2}\Delta T^2 \\ 0 & 0 & 0 & 0 & 0 & 0 & 0 & 1 & \Delta T \\ 0 & 0 & 0 & 0 & 0 & 0 & 0 & 0 & 1 \end{bmatrix}$$

4. Plant Noise Matrix:

$$Q = \begin{bmatrix} q\vartheta & 0 & 0 \\ 0 & q\vartheta & 0 \\ 0 & 0 & q\vartheta \end{bmatrix}$$

where $$\vartheta = \begin{bmatrix} \Delta T^6/9 & \Delta T^5/6 & \Delta T^4/3 \\ \Delta T^5/6 & \Delta T^4/4 & \Delta T^3/2 \\ \Delta T^4/3 & \Delta T^3/2 & \Delta T^2 \end{bmatrix}$$

5. Measurement Vector:

$$m = \begin{bmatrix} x \\ y \\ z \end{bmatrix}$$

6. Measurement Covariance Matrix:

$$R_i = \begin{bmatrix} \sigma_x^2 & \sigma_{xy} & \sigma_{xz} \\ \sigma_{xy} & \sigma_y^2 & \sigma_{yz} \\ \sigma_{xz} & \sigma_{yz} & \sigma_z^2 \end{bmatrix}$$

7. Measurement Matrix:

$$H = \begin{bmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \end{bmatrix}$$

5.2.5 Update SFACT
5.2.5.1 Update SFACT Overview

The SFACT estimate is a fusion of the current CORE and FACT estimates that is sent to the Sensor Server for use by the Correlation, Association and Tracking (CAT) function. It is one of the pieces of information stored in the Sensor Measurement Association & Resolution Track (SMART) file in the Sensor Server. The SFACT estimate is updated in response to one of two events:

A local CORE estimate is sent to STAR for testing.
A CORE (local or remote) is received by CORE Synthesis and used to update the FACT estimate.

When either of these two events occur, the Update_SFACT function produces the new SFACT estimate to be sent to the Sensor Server using the same fusion algorithm as in CORE Synthesis.

Note that the SFACT covariance calculation is the same is the same set of equations used in computing the Filtered_Test_Value in STAR. I.e., STAR is also computing the SFACT covariance matrix. Thus computing the covariance matrix in Update_FACT and then passing it into STAR as input can save computation. Since Update_SFACT may have to be modified once the CAT function has been specified, we will not change the STAR inputs for now.

5.2.5.2 Update SFACT Algorithm
5.2.5.2.1 Inputs
1. Current FACT estimate (time, state, and covariance) on a track.
2. Current CORE estimate (time, state, and covariance) on the track.
3. Flag to indicate that the vehicle is maneuvering.
4. Flag indicating that the SFACT is being updated as a result of a new CORE, a new FACT update by a local CORE, or a new FACT update by a remote CORE.

5.2.5.2.2 Outputs
1. Updated SFACT estimate (time, state, covariance) for the track after fusion of the FACT and CORE estimates.

5.2.5.2.3 Pseudocode
1. IF Event_Flag=FACT_Update_By_Local_CORE
   Let SFACT (time, state, covariance)=FACT (time, state, covariance).
   ELSE
   Fuse CORE and FACT estimates according to the equations given in the CORE Synthesis description below.
   Let SFACT (time, state, covariance)=Fused (time, state, covariance).
   END IF 5.3 State Testing and Adaptive Reporting (STAR)
5.3.1 STAR Overview State Testing and Adaptive Reporting is responsible for determining the value of the state information in a CORE relative to the improvement in the FACT estimate on the track that would result from updating with the CORE. If STAR determines that the CORE will improve the composite track estimate in the FACT, then the CORE will be distributed across the network.

A nine-state CORE is generated whenever PACE first detects that a track has begun to maneuver. The nine-state CORE is needed by CORE Synthesis to increase the FACT estimate from six to nine states. Thus, if the FACT estimate is six-states, then STAR distributes a nine-state CORE to the network without any testing. The real problem for STAR is to determine when to distribute a six-state CORE.

The decision whether or not to send a six-state CORE is based on a test of the accuracy of the FACT estimate with the CORE information versus the accuracy of the FACT estimate predicted without the CORE information. Thus STAR begins the evaluation by predicting the FACT estimate to the time of the current CORE. From the predicted covariance matrix, a submatrix corresponding to the rate-only variances and covariances is extracted; the square root of the maximum eigenvalue of this submatrix is the Predicted_Test_Value. If the Predicted_Test_Value is less than some threshold (STAR_Lower_Threshold), then the FACT is more than accurate enough without the CORE information, so the immediate decision is not to send the CORE. If the Predicted_Test_Value exceeds some threshold (STAR_Upper_Threshold), then the FACT does not have acceptable accuracy and thus the immediate decision is to send the CORE without further testing.

If the predicted test value falls between the lower and upper threshold values, then a test is performed to determine if a significant improvement in the FACT accuracy will result from sending out the CORE. First, the FACT covariance matrix is updated with the CORE covariance. Similar to the above, from the updated covariance matrix, a submatrix corresponding to the rate-only variances and covariances is extracted; the square root of the maximum eigenvalue of this submatrix is the Filtered_Test_Value. The steps in computing the Predicted_Test_Value and Filtered_Test_Value are given in the Equations section below.

Once the Filtered_Test_Value has been computed, the difference D=Predicted_Test_Value−Filtered_Test_Value is taken. If D is greater than some threshold (STAR_Test_Threshold), then the CORE provides a significant improvement in the accuracy of the FACT estimate and thus the CORE will be distributed to the network. If D is less than the STAR_Test_Threshold, then the CORE does not provide a significant improvement in the FACT accuracy and it will not be distributed.

If the vehicle has been identified as maneuvering, different considerations apply. For the maneuvering vehicle, the test value for the predicted state is going to be large and will usually exceed the upper threshold. If we perform the normal STAR processing for a vehicle flagged as maneuvering, then every data conditioner will send out every CORE that it forms. That is not necessarily a bad thing when the vehicle makes a short-duration maneuver, but probably more data than is needed. It will definitely result in too many CORE when the vehicle is performing an extended maneuver. For this reason, when the vehicle has been flagged as maneuvering, STAR will test each CORE as it is generated and not automatically send any CORE without testing. I.e., upper_limit=∞. (We do this only when the track is maneuvering; we still want to send the CORE without testing when the maneuver is first detected.)

5.3.2 STAR Algorithm
5.3.2.1 STAR Inputs
 1. Current FACT estimate (time and covariance only) on a track.
 2. Current CORE estimate (time and covariance only) on the track.
 3. Flag to indicate that the vehicle is maneuvering.
 4. STAR upper and lower test thresholds for the track.

5.3.2.2 STAR Outputs
 1. Flag to indicate that the STAR test passed and that the CORE should be sent-out to update the FACT estimates across the network.
 2. Test values used in the STAR test (for analysis only).

5.3.2.3 STAR Equations
The following is an outline of the steps and equations used in assessing the value of the rate information that is contained in the CORE. The form of the F, Q, and H matrices depend on the number of states in the FACT and CORE estimates. For the details, see CORE Fusion in the CORE Synthesis specification.

Predicted_Test_Value
 Step 1: Obtain the error covariance matrix $P_{k-1/k-1}$ from the FACT.
 Step 2: Compute the predicted error covariance matrix $P_{k/k-1}$ using $P_{k/k-1} = F_{k/k-1} P_{k-1/k-1} F_{k/k-1}^T + Q_k$.
 Step 3: Extract the predicted rate covariance matrix $V_{k/k-1}$ from $P_{k/k-1}$.
 Step 4: Determine the largest eigenvalue $\lambda_{k/k-1}$ of $V_{k/k-1}$.
 Step 5: The rate accuracy without the CORE (Predicted_Test_Value) is given by $\sqrt{\lambda_{k/k-1}}$.

Filtered_Test_Value
 Step 1: Obtain the error covariance matrix $R_k$ from the CORE.
 Step 2: Compute the gain $G_k$ using $G_k = P_{k/k-1} H_k^T (H_k P_{k/k-1} H_k^T + R_k)^{-1}$.
 Step 3: Compute the filtered error covariance matrix $P_{k/k}$ using $P_{k/k} = (I - G_k H_k) P_{k/k-1} (I - G_k H_k)^T + G_k R_k G_k^T$.
 Step 4: Extract the filtered rate covariance matrix $V_{k/k}$ from $P_{k/k}$.
 Step 5: Determine the largest eigenvalue $\lambda_{k/k}$ of $V_{k/k}$.
 Step 6: The rate accuracy with the CORE (Filtered_Test_Value) is given by $\sqrt{\lambda_{k/k}}$.

The decision made by STAR as to send the CORE or to continue accumulating is based on a comparison of the rate accuracy with the CORE and the rate accuracy without the CORE.

5.3.2.4 STAR Pseudocode
IF (Number_CORE_States=9) AND (Number_FACT_States=6)
 1. LET Send_CORE_Flag=Send.
ELSE
 1. Determine Q Matrix based on Number_FACT_States and PACE_Maneuver_Flag.
 2. Determine Predicted_Test_Value as in Equations above.
 3. IF (Number_FACT_States=9)
   LET STAR_Upper_Limit=∞.
   LET STAR_Test_Limit=(Predicted_Test_Value−STAR_Lower_Limit)/4.
  ELSE
   LET STAR_Test_Limit=(STAR_Upper_Limit−STAR_Lower_Limit)/3.
  END IF
 4. IF (Predicted_Test_Value>STAR_Upper_Limit)
   LET Send_CORE_Flag=Send.
  ELSE IF Predicted_Test_Value<STAR_Lower_Limit)
   LET Send_CORE_Flag=Do_Not_Send.
  ELSE
   Determine H Matrix based on Number_FACT_States and Number CORE States.
   Determine Filtered_Test_Value as in Equations above.
   LET D=Predicted_Test_Value−Filtered_Test_Value.
   IF (D>STAR_Test_Limit)
    LET Send_CORE_Flag=Send.
   ELSE
    LET Send_CORE_Flag=Do_Not_Send.
   END IF
  END IF
END IF

5.4 Geodetic Registration and Information Processing (GRIP)

5.4.1 GRIP Overview

GRIP is the component that estimates the local sensor's position and the local sensor's angular bias errors. Registration, which is the process of estimating angular bias error, is accomplished by comparing state estimates consisting of unregistered local only data to state estimates consisting of registered remote only data. GRIP accumulates the stream of unregistered AMRs and uses the maneuver detection likelihood output from PACE to develop track state estimates on vehicles that are good candidates for registration. The local track state estimate is compared to the RFACT that CORE Fusion creates by fusing the CORE received from remote platforms. Four levels of registration are performed depending on the data available from remote sources. For the first three levels of registration, the sensors are assumed to have accurate estimates of their own position from GPS measurements and other NAV sources.

Level 1 registration is performed when the local sensor has measurements on a vehicle that is reporting its GPS measurements as CORE to the TCN network. Such a vehicle is referred to as a reference vehicle. The local sensor's RFACT on the reference vehicle may consist of CORE from remote sensor measurements on the reference vehicle but, because the GPS measurements on the vehicle are generally more accurate than sensor measurements, CORE developed from the reference vehicle's GPS data will dominate the local sensor's RFACT.

Level 2 registration is performed when the local sensor is receiving CORE on mutually measured vehicles from other sensors that are already registered. If the local sensor's CORE are dominating the FACT on one (or more) of the vehicles and the local sensor's RFACT error becomes large, then the distribution of remote CORE may be induced by changing the reporting need on the track or raising the local STAR thresholds.

Level 3 registration is performed when the local sensor is unregistered and is not receiving CORE on mutually measured vehicles from registered sources. This situation occurs when TCN is first turned on and there are no reference vehicles in the network that are contributing CORE based on ownship position data. In order to obtain accurate initial bias estimates, the unregistered sensors must exchange data on mutually measured vehicles without corrupting the network FACT states with unregistered data.

A simple implementation, outlined below, to initialize GRIP is to use the existing DC algorithms to exchange unregistered CORE. Unregistered CORE are formed initially with ACE and exchanged by the DC because the FACT does not exist. To avoid corrupting the FACT with unregistered data and yet use the exchanged data to register, CORE Fusion fuses unregistered CORE with the RFACT but not with the FACT. An initial bias estimate may be obtained with the first unregistered CORE that is received for a mutually measured vehicle. When ACE receives a registered AMR for the first time, it reinitializes its state estimate so that the unregistered data in the current state estimate is not exchanged as registered data. CORE Fusion fuses subsequent registered CORE with the FACT and reinitializes the RFACT. Then, after the sensors are registered, both the FACT and the RFACT are uncorrupted by unregistered data. In the transition from exchanging unregistered data to registered data, valuable track state data may be lost in ACE unless AMRs received prior to the initial bias estimate are corrected and refiltered. More importantly, though, the RFACT used in the initial bias estimate is formed from a single CORE that was itself formed from two measurements, the minimum number required to send out a CORE. Thus, the RFACT is not a very accurate state estimate from which to register and initial errors in the bias estimate are propagated to the state estimates and some delay is incurred before the system converges to the true bias estimate and state estimates.

A more complicated implementation (but the recommended implementation) is to exchange registration CORE formed from measurements that are collected and processed during the period before the TCN network is turned on. Usually the local sensors are collecting data prior to turning on the network. Thus, the local sensor will have a history of AMRs from which it could create a more accurate registration CORE to exchange with other unregistered sensors in the network. The registration CORE can be formed and exchanged by the GRIP sensor components so that the ACE, FACT and RFACT estimates are not corrupted by unregistered data. Registration CORE is a least squares estimate of position based on the AMRs received on a vehicle over a given time period. The covariance between the position terms in the WGS-84 Cartesian coordinate frame is estimated from the residual errors. The registration CORE is exchanged with other unregistered sensors that are also measuring the vehicle and can contribute in the dimension of the angular bias error. Since more than two AMRs are used to develop the registration CORE, exchanging registration CORE reduces the variance on the initial bias estimate, which settles the bias estimates more quickly. The bias variance in the angular dimensions is overestimated in the registration CORE so that the dimension of uncertainty is clearly identified for other sensors using the registration CORE.

Level 4 registration is performed when the local sensor does not have GPS but it does have CORE from registered sensors for vehicles that the local sensor is measuring. The local sensor's translational biases are estimated along with its angular biases using local data sources and remote CORE from registered sensors that do have GPS.

For any level of registration, the angular biases are estimated by comparing the differences in the angular dimension between the local track state estimates and the RFACT estimates relative to the local sensor's tangent plane. Consider the simplest case of estimating the bearing bias of one sensor with measurements on one vehicle. Assume that the sensor's GRIP processor has an estimate of the sensor location and has received uncorrected AMRs on the vehicle. In addition, the sensor's CORE Fusion has received one or more registered CORE on the vehicle from a remote location and formed an RFACT on the vehicle. GRIP initializes and updates a local track state estimate of the vehicle with the uncorrected AMRs. Both the local track state and the RFACT, maintained in WGS-84 Cartesian, are converted to Cartesian coordinates in the local sensor's tangent plane. Assuming the time of the RFACT is prior to the time of the local state estimate, the RFACT is extrapolated to the time of the local track state estimate. The sensor's bearing bias is estimated as the difference between the bearing of the local estimate and the bearing of the RFACT relative to the local sensor's tangent plane. The bias variance is the sum of the bearing error of the local estimate and the bearing error of the RFACT. Note that the bearing error of both the local and remote state estimates include the error accumulated by using the local sensor's geodetic location to convert the state estimates into the local sensor's tangent plane.

The remote CORE could have been received from either a reference vehicle reporting its own GPS location or another sensor with measurements on the mutual vehicle. The reference vehicle filters the GPS measurements of its ownship position and sends the measurements out as CORE according to TCN doctrine. CORE Fusion forms the RFACT with remote CORE and excludes local CORE so that the RFACT is not correlated with the local state estimate of the vehicle.

GRIP also filters the GPS measurements of the sensor's location. The estimated error of a sensor's location should be included in covariance transformations to and from the sensor's local frame of reference. A sensor is said to have GPS if it has current GPS measurements of its own location. Whenever GPS measurements are temporarily unavailable, the navigational biases of the sensor's location must be estimated. In the model, it seems reasonable to simulate the GPS measurements by filtering the estimate of the sensor's position in WGS-84 Cartesian and then converting the estimate to geodetic for (lat, lon, alt) coordinates rather than filter in geodetic coordinates. In practice, however, other NAV sources should be included in the sensor's location estimate and the filter coordinate frame may depend on the available GPS receiver. In the simulation, the sensor GPS measurements are not filtered; however, for a more accurate representation of the system, they should be. The sensor GPS measurements should not be sent out as CORE unless the sensor is a reference vehicle in the DCN network.

The bias estimates of the sensors in a network improve as more sensors in the network have more tracks in common. If multiple sensors have measurements on a vehicle, then the sensor with the best geometry with respect to the vehicle and the other sensors should be contributing more data to the FACT and, consequently, more data to the RFACTs of the other sensors. When a group of sensors has multiple tracks in common, each sensor's GRIP processor has a bias estimate associated with each of its track state estimates. Each sensor's bias estimate is a weighted sum of the bias estimates associated with each of its track state estimates. Depending on the geometry of the sensors and the vehicles, Level 1 registration will in general provide more accurate bias estimates than Level 2 registration. Bias estimates on vehicles from any level of registration are weighted together so that the more accurate bias estimates are weighted more heavily than the less accurate estimates. The bias weighting is described more fully in the algorithm description. Though not implemented in the simulation, the sensor bias should be maintained for immediate use rather than calculating the bias upon receipt of a query. After each sensor measurement is processed and the bias for that vehicle estimated, the old contribution of that vehicle can be subtracted from the weighted sensor bias and variance and the new contribution of that vehicle added.

The GRIP processor estimates the vehicle track states with a Converted Measurement Kalman Filter that approximates curved trajectories with linear trajectories. In GRIP, the vehicles are tracked over fairly long periods of time without resetting the filter. For constant altitude vehicles following WGS-84 geodesic paths, the errors in the linear approximations can accumulate and the effects of the accumulated errors can be noticeable, depending on the q-value selection of the GRIP local state filter. By approximating the centripetal acceleration of the vehicle and adding those acceleration terms to the predicted state, the pseudo-acceleration caused by the curvature of the earth may be accounted for in the linear Kalman filter. However, for large enough q-values, the error from the curvature of the earth is absorbed as white noise in the filter processing.

Since the bias estimate obtained from data on a maneuvering vehicle is likely to be inaccurate, only bias estimates which are likely to have been calculated from data prior to the onset of a maneuver should be used to correct the unaligned AMR stream. PACE outputs a flag indicating the number of consecutive measurement residuals that have failed the maneuver test hypothesis. As this number increases, the more likely it is that a maneuver began near the time of the first measurement in the sequence of failures. Any bias estimates using that first measurement or any measurements since then should not be used to correct the AMR stream until the possibility of a maneuver is eliminated. Thus, a history of bias estimates is stored and the most accurate bias estimate is used in correcting the AMR stream. When a maneuver is detected in a track state estimate, bias calculations using the current state estimate are suspended until the vehicle is no longer maneuvering. While bias calculations are suspended, the maneuver can be estimated with a high q-value in the filter equations. There may be lags that appear in the bias estimates; however, if the lag in the local state and the lag in the RFACT are approximately the same, the bias can still be estimated accurately. During the maneuver, a local state estimate on the vehicle from a time prior to the onset of the maneuver is used to estimate the bias.

The q-values selected for GRIP are slightly different than for ACE due to the differing goals. of the components. In ACE, a maneuver must be followed with as little lag as possible but in GRIP it is desirable for the variance of the bias estimate to be in a steady state whenever the bias itself is not changing. Since the bias is reflected in the differences between two lagging state estimates on the maneuvering vehicle, the maneuver can be followed in the GRIP filtered state without using quite as much noise input, i.e. using a smaller q-value.

As the geometry between sensors and a moving vehicle changes during the period when the sensors are mutually measuring the vehicle, the variance of the bias estimate on a vehicle is likely to change. The bias estimate obtained when the sensor and vehicle geometry was near 90° is more accurate than the bias estimate obtained when the sensors and vehicle are aligned. Thus, the bias obtained during a period of good geometry should be used during periods of poor geometry. On the other hand, old data should be discarded since the bias could change periodically or be slowly varying. Thus, the most accurate state within a recent time interval should be used to estimate the bias, i.e. for registration purposes the most recent data is not necessarily the most accurate data. In general, the most accurate bias estimate will be the one following an update to the RFACT, i.e. when the extrapolation error is the smallest, the state is most accurate. Thus, it may be more practical to update the local GRIP filter each time an AMR is received but only update the bias estimate when an RFACT update is received. Since the bias estimate should be updated regularly, the RFACT should also be updated regularly using adjustments to the reporting need on the track and the STAR thresholds that will induce other sensors to report on the track.

5.4.2 GRIP Algorithm
5.4.2.1 GRIP Inputs
1. Unaligned AMR in WGS-84 Cartesian.
2. A matrix of measurements.
3. GPS measurement in Geodetic, corresponding to the time of the AMR.
4. A matrix of GPS measurements.
5. Filtered state maintained by GRIP.
6. The matrix of RFACTs on the vehicle
7. A matrix of bias estimates and a row indicator
8. Number of consecutive measurements that have failed the PACE residual test, onset time and new maneuver flag from PACE 9. Number of consecutive failures to declare a maneuver
10. Q-value to use in the GRIP filter when the vehicle is not maneuvering
11. Q-value to use in the GRIP filter when the vehicle is maneuvering 5.4.2.2 GRIP Outputs
1. Updated matrix of measurements
2. Filtered state maintained by GRIP
3. Updated matrix of GPS measurements
4. Updated matrix of bias estimates
5. Updated row indicator.

5.4.2.3 GRIP Pseudocode
For each measurement m of a vehicle by a sensor:
1. For m=1,
   1) Store the measurement.
2. For m=2,
   1) Store the measurement.
   2) Initialize the filtered state estimate.
   3) If there is a RFACT available for the vehicle, calculate the bias estimate.
   4) Store the bias estimate.
3. For m>2,
   1) Store the measurement.
   2) Update the filtered state estimate.
   3) Get the most recent RFACT.
   4) Calculate the bias estimate and store.
   5) Update the row indicator as follows:
      a) If the most recent bias estimate is more accurate than the previous bias estimate and the current number of consecutive failures of the PACE residual test is 0, than replace the current row indicator with the row number of the most recent bias estimate.
      b) If the time of the previous bias estimate has exceeded the age threshold, find the most accurate bias estimate since then that was not estimated with maneuvering data. (check if a maneuver occurred following the estimate and what the number of consecutive failures of the PACE residual test was at the time of the measurement) Update the row indicator with the row number of that bias estimate.

For a track state estimate $[x,\dot{x},y,\dot{y},z,\dot{z}]$ in a sensor's local frame of reference, the bearing b and bearing variance σ are $$b = \tan^{-1}\left(\frac{x}{y}\right)$$

$$\sigma^2 = \frac{x^2\sigma_y^2 + y^2\sigma_x^2 - 2xy\sigma_{xy}}{(x^2+y^2)^2}.$$

To calculate the bias estimate, given a local state estimate and an RFACT on a vehicle:
1) Convert the local state estimate and the RFACT from WGS-84 Cartesian to local coordinates and add the GPS error to the covariance matrices.
2) Extrapolate the RFACT to the time of the local state estimate.
3) Calculate the bearing $b_1$ and bearing variance $\sigma_1^2$ of the local state estimate and the bearing $b_r$ and bearing variance $\sigma_r^2$ the RFACT.
4) The bias estimate is the difference between the bearing of the local estimate and the bearing of the remote estimate bias=$b_1-b_r$. The bias variance estimate is the sum of the bearing error variances of the local and remote estimates $\sigma_{bias}^2 = \sigma_1^2 + \sigma_r^2$.

To weight bias estimates, suppose there are n bias estimates available, denoted by $b_i$, i=1, ..., n with error variance $\sigma_i^2$, i=1, ..., n. The weighting factor for the $i_{th}$ bias is $$w_i = \frac{\frac{1}{\sigma_i^2}}{\sum_{i=1}^{n} \frac{1}{\sigma_i^2}}.$$

Then the weighted bias is $$b = \sum_{i=1}^{n} w_i b_i$$

and the weighted variance is $$\sigma^2 = \sum_{i=1}^{n} w_i^2 \sigma_i^2 = \frac{1}{\sum_{i=1}^{n} \frac{1}{\sigma_i^2}}.$$

6.0 CORE Synthesis

The CORE Synthesis component receives COREs from both Sensor Data Conditioners (SDCs) and Link Data Conditioners (LDCs). CORE Synthesis is responsible for maintaining three composite track state estimates that are distributed within the local segment. The first, called the Fusion Algorithm Combined Track (FACT), is a composite of all of the CORE estimates on the track that have been distributed by the Data Conditioners on the network. The second estimate, called the Remote FACT (RFACT) estimate, is constructed the same as the FACT but uses only COREs which are generated by Data Conditioners from remote platforms. The third estimate, called the Alignment FACT (AFACT), uses only COREs from the local platform sensor that has been designated the "primary" sensor.

The same fusion algorithm is used to update each of the three FACT estimates. Thus in the CORE fusion specification below, only the FACT update is specified. Replace "FACT" and "CORE" by "RFACT" and "Remote CORE" or "AFACT" and "Primary Sensor CORE" to get the specification for the other two cases.

6.2 CORE Fusion
6.2.1 Core Fusion Overview

FACT estimates are 6 or 9 states. The CORE estimates which update them are n=3, 6, or 9 states with a full n×n matrix of variances and covariances. Table 2 outlines how the FACT is updated as a function of the number of states in each estimate.

TABLE 2

| | FACT Update Function | | |
|---|---|---|---|
| N(FACT$_0$) | N(CORE) | N(FACT$_1$) | Update |
| 6 | 3 | 6 | Update with 3 × 6 H matrix. |
| 6 | 6 | 6 | Update with H = I$_6$. |
| 6 | 9 | 9 | Update with the least squares fit described in the Equations section below. |
| 9 | 3 | 9 | Update with 3 × 9 H matrix. |
| 9 | 6 | 9 or 6 | Update with 6 × 9 H matrix; if no 9 state CORE have been received for a while, test to see if we can drop the acceleration estimates. |
| 9 | 9 | 9 | Update with H = I$_9$. |

6.2.2 CORE Fusion Algorithm
6.2.2.1 Inputs
1. Current FACT estimate (time, state, and covariance) on a track.
2. Current CORE estimate (time, state, and covariance) on the track.
3. Flag to indicate that the vehicle is maneuvering.
4. Time of the last FACT fusion with a maneuvering CORE.
5. Number of non-maneuvering CORE since last maneuvering CORE fusion.

6.2.2.2 Outputs
1. Updated FACT estimate (time, state, covariance) for the track after fusion with CORE estimate.
2. Updated time of the last FACT fusion with a maneuvering CORE.
3. Updated number of non-maneuvering CORE since last maneuvering CORE fusion.

6.2.2.3 Equations
For all the cases except $N(FACT_0)=6$ and $N(CORE)=9$, the covariance is updated using the same equations as in computing the Filtered_Test_Value in the STAR function description above. In these cases, the fused FACT state is computed by the following equations.

Let
$\hat{x}$=FACT_Estimate
P=FACT_Covariance
$\hat{z}$=CORE_Estimate
R=CORE_Covariance
$\Delta T = T_{CORE} - T_{FACT}$
Then the CORE Fusion equations are as follows.

$$\hat{x}_{k/k-1} = F_{k/k-1}\hat{x}_{k-1/k-1}$$
$$P_{k/k-1} = F_{k/k-1}P_{k-1/k-1}F_{k/k-1}^T + Q_k$$
$$G_k = P_{k/k-1}(H_k^T(H_k P_{k/k-1}H_k^T + R_k))^{-1}$$
$$P_{k/k} = (I - G_k H_k)(P_{k/k-1}(I - G_k H_k))^T + G_k R_k G_k^T$$
$$\hat{x}_{k/k} = \hat{x}_{k/k-1} + G_k(\hat{z}_k - H_k \hat{x}_{k/k-1})$$

For a six-state FACT estimate, the F and Q matrices have the following form.

Transition Matrix $$F_{k/k-1} = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix}$$

Plant Noise Matrix $$Q_k = \begin{bmatrix} q\vartheta & 0 & 0 \\ 0 & q\vartheta & 0 \\ 0 & 0 & q\vartheta \end{bmatrix}$$

where $$\vartheta = \begin{bmatrix} \Delta T^4/3 & \Delta T^3/2 \\ \Delta T^3/2 & \Delta T^2 \end{bmatrix}$$

In the case of a nine-state FACT estimate, these matrices have the following form.

Transition Matrix $$F_{k/k-1} = \begin{bmatrix} 1 & \Delta T & \frac{1}{2}\Delta T^2 & 0 & 0 & 0 & 0 & 0 & 0 \\ 0 & 1 & \Delta T & 0 & 0 & 0 & 0 & 0 & 0 \\ 0 & 0 & 1 & 0 & 0 & 0 & 0 & 0 & 0 \\ 0 & 0 & 0 & 1 & \Delta T & \frac{1}{2}\Delta T^2 & 0 & 0 & 0 \\ 0 & 0 & 0 & 0 & 1 & \Delta T & 0 & 0 & 0 \\ 0 & 0 & 0 & 0 & 0 & 1 & 0 & 0 & 0 \\ 0 & 0 & 0 & 0 & 0 & 0 & 1 & \Delta T & \frac{1}{2}\Delta T^2 \\ 0 & 0 & 0 & 0 & 0 & 0 & 0 & 1 & \Delta T \\ 0 & 0 & 0 & 0 & 0 & 0 & 0 & 0 & 1 \end{bmatrix}$$

Plant Noise Matrix $$Q_k = \begin{bmatrix} q\vartheta & 0 & 0 \\ 0 & q\vartheta & 0 \\ 0 & 0 & q\vartheta \end{bmatrix}$$

where $$\vartheta = \begin{bmatrix} \Delta T^6/9 & \Delta T^5/6 & \Delta T^4/3 \\ \Delta T^5/6 & \Delta T^4/4 & \Delta T^3/2 \\ \Delta T^4/3 & \Delta T^3/2 & \Delta T^2 \end{bmatrix}$$

The H matrix depends on the number of states in both the FACT and the CORE estimate; the following are the H matrices for each of the cases.

1. $N(FACT_0)=6$ and $N(CORE)=3$:

$$H_k = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}$$

2. $N(FACT_0)=6$ and $N(CORE)=6$: $H_k=I_6$, the 6×6 identity matrix.

3. $(FACT_0)=9$ and $N(CORE)=3$:

$$H_k = \begin{bmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \end{bmatrix}$$

4. $N(FACT_0)=9$ and $N(CORE)=6$:

$$H_k = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 1 & 0 & 0 \end{bmatrix}$$

5. $N(FACT_0)=9$ and $N(CORE)=9$: $H_k=I_9$, the 9×9 identity matrix.

In the case where $N(FACT_0)=6$ and $N(CORE)=9$, the new FACT estimate is computed using the following least squares technique.

The FACT and CORE can be modeled mathematically as $$\hat{z} = Hx + \varepsilon$$

where $\hat{x}_f = 6\_\text{state}\_\text{FACT}\_\text{estimate}$ $\hat{P}_f = 6\_\text{state}\_\text{FACT}\_\text{covariance}$ $\hat{x}_c = 9\_\text{state}\_\text{CORE}\_\text{estimate}$ $\hat{P}_c = 9\_\text{state}\_\text{CORE}\_\text{covariance}$ $T = T_{CORE} - T_{FACT}$ $$\hat{z} = \begin{bmatrix} \hat{x}_f \\ \hat{x}_c \end{bmatrix}$$

$x = [x \ \dot{x} \ \ddot{x} \ y \ \dot{y} \ \ddot{y} \ z \ \dot{z} \ \ddot{z}]^t$ $E[\varepsilon] = 0$ $E[\varepsilon \varepsilon^t] = \Omega$ $$= \begin{bmatrix} \hat{P}_f & 0_{6\times 9} \\ 0_{9\times 6} & \hat{P}_c \end{bmatrix}$$

and H is given by the following:

$$H = \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 1 & T & \frac{T^2}{2} & 0 & 0 & 0 & 0 & 0 & 0 \\ 0 & 1 & T & 0 & 0 & 0 & 0 & 0 & 0 \\ 0 & 0 & 1 & 0 & 0 & 0 & 0 & 0 & 0 \\ 0 & 0 & 0 & 1 & T & \frac{T^2}{2} & 0 & 0 & 0 \\ 0 & 0 & 0 & 0 & 1 & T & 0 & 0 & 0 \\ 0 & 0 & 0 & 0 & 0 & 1 & 0 & 0 & 0 \\ 0 & 0 & 0 & 0 & 0 & 0 & 1 & T & \frac{T^2}{2} \\ 0 & 0 & 0 & 0 & 0 & 0 & 0 & 1 & T \\ 0 & 0 & 0 & 0 & 0 & 0 & 0 & 0 & 1 \end{bmatrix}$$

If $\Phi$ is given by the following $$\Phi = \begin{bmatrix} F & 0_{3\times 3} & 0_{3\times 3} \\ 0_{3\times 3} & F & 0_{3\times 3} \\ 0_{3\times 3} & 0_{3\times 3} & F \end{bmatrix}$$

where $$F = \begin{bmatrix} 1 & T & \frac{T^2}{2} \\ 0 & 1 & T \\ 0 & 0 & 1 \end{bmatrix}$$

Then the updated FACT state and covariance matrix is given by the following:

$\hat{x}_f^+ = \Phi(H^t \Omega^{-1} H)^{-1} H^t \Omega^{-1} \hat{z}$ $\hat{P}_f^+ = \Phi(H^t \Omega^{-1} H)^{-1} \Phi^t$ 6.2.2.4 Pseudocode Suppose that Time_Limit and Update_Limit are predefined constants that determine when a FACT state will be changed from maneuvering to non-maneuvering. Time_Limit refers to the time since the last update by a maneuvering CORE and Update Limit refers to the number of consecutive non-maneuvering received.

1. IF Maneuver_Flag=Maneuvering
   Let Time_Since_Last_Hi_Q=CORE_Time.
   Let Number_Of_Low_Q=0.
   ELSE
   Time_Since_Last_Hi_Q does not change.
   Let Number_Of_Low_Q=Number_Of_Low_Q+1.
   END IF
2. Fuse the CORE with the FACT according to the equations above; note that the case N(CORE)=9·N(FACT)=6 requires a different set of equations from the other cases.
3. Let ΔT=CORE_Time−Time_Since_Last_Hi_Q.
4. IF N(CORE)=6·N(FACT)=9
   IF ΔT>Time_Limit·Number_Of_Low_Q>Update_Limit
   Let the FACT change from a nine-state estimate to a six-state estimate.
   ELSE
   Keep the FACT at nine-states
   END IF
   END IF 6.3 Distribution Processing
TBS Please Provide this Information The individual components shown in outline or designated by blocks in the drawings are all well-known in the vehicle telemetry arts, and their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be a corded the broadest interpretation so as to encompass all such modifications and equivalents structures and functions.

What is claimed is:

1. Apparatus for sharing vehicle telemetry information between a plurality of sensors of different types and a plurality of users of different types, at least one of said sensors and at least one of said users being not on board said vehicle, said apparatus comprising:

a communications network coupling together the plurality of sensors and the plurality of users;

a plurality of sensor processor devices respectively coupled to the plurality of sensors, each processor device configured to receive vehicle telemetry information from its associated sensor, and to convert the received vehicle information into common vehicle data of a type common to the plurality of users; and a plurality of user processor devices respectively coupled to the plurality of users, each processor device configured to receive a demand signal from its associated user and to transmit it to said communications network when it determines that its associated user has a predetermined vehicle profile which requires improvement;

each of said plurality of sensor processor devices receiving the demand signal from said communications network and transmitting its common vehicle data to the communications network when it determines that its associated sensor can provide vehicle information which improves said vehicle information profile.

2. Apparatus according to claim 1, wherein the predetermined vehicle profile comprises a fused vehicle profile including vehicle information updates from each of said plurality of sensors.

3. Apparatus according to claim 2, wherein each of said plurality of user processor devices assembles its own fused vehicle profile.

4. Apparatus for sharing vehicle telemetry information between a plurality of sensors of different types and a plurality of users of different types, comprising:
- a communications network coupling together the plurality of sensors and the plurality of users;
- a plurality of sensor processor devices respectively coupled to the plurality of sensors, each processor device configured to receive vehicle telemetry information from its associated sensor, and to convert the receive vehicle information into common vehicle data of a type common to the plurality of users; and
- a plurality of user processor devices respectively coupled to the plurality of users, each processor device configured to receive a demand signal from its associated user and to transmit it to said communications network when it determines that its associated user has a predetermined vehicle profile which requires improvement;
- each of said plurality of sensor processor devices receiving the demand signal from said communications network and transmitting its common vehicle data to the communications network when it determines that its associated sensor can provide vehicle information which improves said vehicle information profile, wherein one of said user processor devices requires a different predetermined vehicle profile for the same vehicle than another of said plurality of user processor devices.

5. Apparatus according to claim 4, wherein said vehicle profile comprises a performance profile for one of an airborne vehicle, a space vehicle, a land vehicle, a sea vehicle, and a sub-sea vehicle.

6. Apparatus for sharing vehicle telemetry information between a plurality of sensors of different types and a plurality of users of different types, comprising:
- a communications network coupling together the plurality of sensors and the plurality of users;
- a plurality of sensor processor devices respectively coupled to the plurality of sensors, each processor device configured to receive vehicle telemetry information from its associated sensor, and to convert the receive vehicle information into common vehicle data of a type common to the plurality of users; and
- a plurality of user processor devices respectively coupled to the plurality of users, each processor device configured to receive a demand signal from its associated user and to transmit it to said communications network when it determines that its associated user has a predetermined vehicle profile which requires improvement;
- each of said plurality of sensor processor devices receiving the demand signal from said communications network and transmitting its common vehicle data to the communications network when it determines that its associated sensor can provide vehicle information which improves said vehicle information profile, wherein each of said plurality of sensor processor devices determines whether its associated sensor can provide vehicle information which improves said vehicle information profile by comparing an error of the predetermined vehicle profile with an error of an improved vehicle profile which would result if the vehicle information of the associated sensor was incorporated into the predetermined vehicle profile.

7. Apparatus according to claim 6, wherein each of said plurality of sensor processors compares the error of the predetermined vehicle profile with a first threshold and a second threshold, (i) if said error of the predetermined vehicle profile is above the first threshold, the vehicle information of the associated sensor is transmitted to the communications network, and the predetermined profile is improved, (ii) if said error of the predetermined profile is below the second threshold, the vehicle information of the associated sensor is not transmitted to the communications network, and the predetermined vehicle profile is not improved, (iii) if said error of the predetermined vehicle profile is between the first and second thresholds, an improved error of the predetermined vehicle profile is calculated based on vehicle information from the associated sensor and the improved error is compared to a third threshold to determine whether the associated sensor can provide vehicle information which improves said vehicle information profile.

8. Apparatus according to claim 7, wherein each of said plurality of sensor processor devices converts the received vehicle information into a common coordinate system.

9. Apparatus according to claim 1, wherein each of said plurality of user processors transmits a demand signal which is based on vehicle track, geographic location, and the predetermined vehicle profile.

10. Apparatus according to claim 1, wherein the plurality of sensors are respectively co-located with the plurality of users.

11. Apparatus according to claim 10, wherein said plurality of sensors are selected from among a group consisting of radar sensors, infrared sensors, laser sensors, and audio sensors.

12. Apparatus for sharing vehicle telemetry information between a plurality of sensors of different types and a plurality of users of different types, comprising:
- a communications network coupling together the plurality of sensors and the plurality of users;
- a plurality of sensor processor devices respectively coupled to the plurality of sensors, each processor device configured to receive vehicle telemetry information from its associated sensor, and to convert the receive vehicle information into common vehicle data of a type common to the plurality of users; and
- a plurality of user processor devices respectively coupled to the plurality of users, each processor device configured to receive a demand signal from its associated user and to transmit it to said communications network when it determines that its associated user has a predetermined vehicle profile which requires improvement;
- each of said plurality of sensor processor devices receiving the demand signal from said communications network and transmitting its common vehicle data to the communications network when it determines that its associated sensor can provide vehicle information which improves said vehicle information profile, wherein a second plurality of sensors and a second plurality of sensor processor devices are integrated into the apparatus without degrading performance of said plurality of sensor processor devices and said plurality of user processor devices.

13. Apparatus for sharing vehicle telemetry information between a plurality of sensors of different types and a plurality of users of different types, comprising:
- a communications network coupling together the plurality of sensors and the plurality of users;
- a plurality of sensor processor devices respectively coupled co the plurality of sensors, each processor device configured to receive vehicle telemetry information from its associated sensors and to convert the receive vehicle information into common vehicle data of a type common to the plurality of users; and
- a plurality of user processor devices respectively coupled to the plurality of users, each processor device configured to receive a demand signal from its associated user and to transmit it to said communications network when it determines that its associated user has a predetermined vehicle profile which requires improvement;
- each of said plurality of sensor processor devices receiving the demand signal from said communications network and transmitting its common vehicle data to the communications network when it determines that its associated sensor can provide vehicle information which improves said vehicle information profile, wherein one of said plurality of sensor processor devices receives vehicle information from the associated sensor of another of said plurality of sensor devices.

14. A system for communicating vehicle track information, over a communications network, among a plurality of platforms each of which has (i) a sensor and (ii) an operational unit which requires the vehicle track information, said system comprising:
- first processing structure, coupled to a first one of said platforms, for processing vehicle track data from its associated first sensor and providing it to its associated first operational unit, said first processing structure providing a first current observation related estimate based on (i) the vehicle track data from the first sensor and (ii) reporting needs of the associated first operational unit or reporting needs received over the communications network, said first processing structure transmitting reporting needs to the communications network when it determines that its associated first operational unit requires an update to a stored first vehicle track profile;
- second processing structure, coupled to a second one of said platforms, for processing vehicle track data from its associated second sensor and providing it to its associated second operational unit, said the second processing structure providing a second current observation related estimate based on (i) the vehicle track data from the second sensor and (ii) reporting needs of the associated second operational unit or reporting needs received over the communications network, said second processing structure transmitting a reporting need to the communications network when it determines that its associated second operational unit requires an update to a stored second vehicle track profile; and
- each said processing structure developing a fusion algorithm combined track by fusing together (i) current observation related estimates received over the communications network and (ii) current observation related estimates provided by that processing structure.

15. A system according to claim 14, wherein each said processing structure transmits its current observation related estimate to the communications network when it determines that the vehicle track data from its associated sensor is responsive to a reporting need received over the communications network.

16. A system according to claim 14, wherein each current observation related estimate includes data with respect to a common coordinate system.

17. A system according to claim 14, wherein each said processing structure issues reporting needs comprising vehicle track identity.

18. A system according to claim 14, wherein each said processing structure provides its fusion algorithm combined track to its associated operational unit.

19. A system according to claim 14, wherein each said processing structure transmits a current observation related estimate to the communications network when a predetermined error rate of the fusion algorithm combined track exceeds a predetermined threshold.

20. A system according to claim 14, wherein each said processing structure transmits a current observation related estimate to the communications network when its associated sensor detects that the vehicle has changed direction.

21. A system according to claim 14, wherein each current observation related estimate is unattributable to said first sensor or to said second sensor.

22. A method of distributing vehicle track data over a communications network to a plurality of users each of which comprises a sensor and an operational unit, comprising the steps of:
- sensing a vehicle track with a first sensor of a first user;
- generating, at the first user, a first current observation related estimate based on the sensed vehicle track and reporting needs;
- transmitting the first current observation related estimate to the communications network when it is determined that the first current observation related estimate will improve a predetermined vehicle track profile;
- receiving, at the first user, a second current observation related estimate generated by a second user and transmitted over the communications network;
- fusing, at the first user, the first current observation related estimate and the second current observation related estimate to provide a fusion algorithm combined track; and
- providing the fusion algorithm combined track to a first operational unit.

23. A method according to claim 22, further comprising the steps of:
- sensing a vehicle track of the same vehicle with a second sensor of a second user;
- generating, at the second user, a second current observation related estimate based on the sensed vehicle track and the reporting needs;
- transmitting the second current observation related estimate to the communications network when it is determined that the second current observation related estimate will improve the predetermined vehicle track profile;
- receiving, at the second user, the first current observation related estimate generated by the first user and transmitted over the communications network;
- fusing, at the second user, the first current observation related estimate and the second current observation related estimate to provide a second fusion algorithm combined track; and
- providing the second fusion algorithm combined track to the second operational unit.

24. A method according to claim 23, wherein the first and the second current observation related estimates each comprises a common coordinate system.

25. A method according to claim 24, wherein each of the first and second users transmits reporting needs to the communications network.

26. A method according to claim 25, wherein the reporting needs of the first user are different than the reporting needs of the second user.

27. A method according to claim 23, wherein each said user determines whether its associated sensor can provide vehicle information which improves the predetermined vehicle profile by comparing an error of the predetermined vehicle profile with an error of an improved vehicle profile which would result if the vehicle data of the associated sensor was incorporated into the predetermined vehicle profile.

28. A method according to claim 23, wherein said first sensor and said second sensor are different sensor types.

29. A method according to claim 23, wherein said first user and said second user are disposed in different geographic locations.

30. A method according to claim 23, wherein the first user requires a different predetermined vehicle profile for the same vehicle than the second user.

31. A method according to claim 23, wherein in the first sensor and the second sensor are each capable of detecting a vehicle selected from the group consisting of an airborne vehicle, a space vehicle, a land vehicle, a sea vehicle, and a sub-sea vehicle.

32. A method according to claim 22, wherein the current observation related estimate comprises data in the WGS 84 coordinate system.

33. One or more computer-readable storage mediums containing one or more computer programs for causing one or more computers to distribute vehicle track data over a communications network to a plurality of users each of which comprises a sensor and an operational unit, the one or more computers being caused by the one or more computer programs to perform the steps of:

sensing a vehicle track with a first sensor of a first user;

generating, at the first user, a first current observation related estimate based on the sensed vehicle track and reporting needs;

transmitting the first current observation related estimate to the communications network when it is determined that the first current observation related estimate will improve a predetermined vehicle track profile;

receiving, at the first user, a second current observation related estimate generated by a second user and transmitted over the communications network;

fusing, at the first user, the first current observation related estimate and the second current observation related estimate to provide a fusion algorithm combined track; and providing the fusion algorithm combined track to a first operational unit.

34. One or more computer-readable recording mediums according to claim 33, further comprising one or more computer programs which cause the one or more computers to perform the steps of:

sensing a vehicle track of the same vehicle with a second sensor of a second user;

generating, at the second user, a second current observation related estimate based on the sensed vehicle track and the reporting needs;

transmitting the second current observation related estimate to the communications network when it is determined that second current observation related estimate will improve the predetermined vehicle track profile;

receiving, at the second user, the first current observation related estimate generated by the first user and the transmitted over the communications network;

fusing, at the second user, the first current observation related estimate and the second current observation related estimate to provide a second fusion algorithm combined track; and providing the second fusion algorithm combined track to the second operational unit.

35. Apparatus for sharing vehicle telemetry information between a plurality of sensors of different types and a plurality of users of different types, at least one of said sensors and at least one of said users being not on board said vehicle, said apparatus comprising:

a communications network coupling together the plurality of sensors and the plurality of users;

a plurality of sensor processor devices respectively coupled to the plurality of sensors, each processor device configured to receive vehicle telemetry information from its associated sensor, and to convert the receive vehicle information into common vehicle data of a type common to the plurality of users; and a plurality of user processor devices respectively coupled to the plurality of users, each processor device configured to receive a demand signal from its associated user and to transmit it to said communications network;

each of said plurality of sensor processor devices receiving the demand signal from said communications network and transmitting its common vehicle data to the communications network, the common vehicle profile comprising a fused vehicle profile including vehicle information updates from each of said plurality of sensors, each of said plurality of user processor devices assembling its own fused vehicle profile.

* * * * *